United States Patent
Phung et al.

(10) Patent No.: US 11,949,439 B2
(45) Date of Patent: Apr. 2, 2024

(54) MITIGATING BASEBAND PULSE DISPERSION VIA RADIOFREQUENCY-TO-BASEBAND CONVERSION

(71) Applicant: International Business Machines Corporation, Armonk, NY (US)

(72) Inventors: Timothy Phung, Milpitas, CA (US);
Devin Underwood, Bronx, NY (US);
Jiri Stehlik, New York, NY (US);
David Zajac, Valley Cottage, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 17/552,580

(22) Filed: Dec. 16, 2021

(65) Prior Publication Data
US 2023/0198555 A1    Jun. 22, 2023

(51) Int. Cl.
*H05K 9/00*       (2006.01)
*G06N 10/40*      (2022.01)
(Continued)

(52) U.S. Cl.
CPC ........... *H04B 1/0096* (2013.01); *G06N 10/40* (2022.01); *H04B 1/0028* (2013.01)

(58) Field of Classification Search
CPC .... H04B 1/0096; H04B 1/0028; G06N 10/40; G06N 10/00
(Continued)

(56) References Cited

U.S. PATENT DOCUMENTS 7,965,761 B2    6/2011   Shattil
2018/0013052 A1*  1/2018   Oliver .................... H10N 69/00
(Continued)

FOREIGN PATENT DOCUMENTS

CN     109217939 A     1/2019
CN     109800882 A     5/2019
(Continued)

OTHER PUBLICATIONS

Rol, M.A. et al. | "Time-domain characterization and correction of on-chip distortion of control pulses in a quantum processor". Appl. Phys. Lett. 116, 054001 (2020); https://doi.org/10.1063/1.5133894, 13 pages.
(Continued)

*Primary Examiner* — Tanmay K Shah
(74) *Attorney, Agent, or Firm* — Amin, Turocy & Watson, LLP

(57) ABSTRACT

Systems and techniques that facilitate mitigation of baseband pulse distortion via radiofrequency-to-baseband conversion are provided. In various embodiments, a system can comprise a qubit. In various aspects, the system can further comprise a signal generator that can produce a radiofrequency signal. In various instances, the system can further comprise a signal converter coupled between the qubit and the signal generator. In various cases, the signal converter can convert the radiofrequency signal into a baseband signal. In various aspects, such radiofrequency-to-baseband conversion can reduce a dispersion-induced distortion associated with driving the qubit.

20 Claims, 20 Drawing Sheets
(7 of 20 Drawing Sheet(s) Filed in Color)

(51) Int. Cl.
  *H04B 1/00* (2006.01)
  *H04B 1/40* (2015.01)
(58) Field of Classification Search
  USPC .................................................. 455/552.1
  See application file for complete search history.

(56) References Cited

U.S. PATENT DOCUMENTS

| | | | | |
|---|---|---|---|---|
| 2020/0320423 | A1* | 10/2020 | Kelly | G06N 10/00 |
| 2020/0403137 | A1* | 12/2020 | Lampert | G06N 10/00 |
| 2021/0013391 | A1 | 1/2021 | Johnson et al. | |
| 2023/0006467 | A1* | 1/2023 | Fan | H02J 50/001 |

FOREIGN PATENT DOCUMENTS

| | | |
|---|---|---|
| KR | 20160093946 A | 8/2016 |
| WO | 2020183060 A1 | 9/2020 |

OTHER PUBLICATIONS

Mell et al., "The NIST Definition of Cloud Computing," Recommendations of the National Institute of Standards and Technology, NIST Special Publication 800-145, Sep. 2011, 7 pages.

\* cited by examiner

MITIGATING BASEBAND PULSE DISPERSION VIA RADIOFREQUENCY-TO-BASEBAND CONVERSION

BACKGROUND

The subject disclosure relates to baseband pulses, and more specifically to mitigating dispersion of baseband pulses via radiofrequency-to-baseband conversion.

In the field of quantum computing, qubit devices are controlled by baseband pulses. In other words, quantum gates are applied to qubit devices by exposing the qubit devices to baseband pulses. Baseband pulses are often generated using room temperature electronics, and thus such baseband pulses often must be transmitted through non-superconducting cables.

Currently, there exist three typical techniques for applying baseband pulses. The first technique includes inserting sufficiently long wait-times between consecutive baseband pulses. Unfortunately, this first technique significantly reduces the number of baseband pulses, and thus the number of quantum gate operations, that can be applied to a qubit device within the coherence time of the qubit device. The second technique includes applying deconvolution computations so as to identify a pre-distorted baseband pulse, such that the pre-distorted baseband pulse will take on an undistorted shape when exposed to the dispersion-induced distortion. However, this second technique is computationally intensive and difficult to implement in practice. Lastly, the third technique includes transmitting baseband pulses only along superconducting cables. Unfortunately, this third technique is expensive and impractical for room-temperature electronics.

Thus, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus, and/or computer program products that can facilitate mitigation of baseband pulse distortion via radiofrequency-to-baseband conversion are described.

According to one or more embodiments, a system is provided. The system can comprise a qubit. In various aspects, the system can further comprise a signal generator that can produce a radiofrequency signal. In various instances, the system can further comprise a signal converter coupled between the qubit and the signal generator. In various cases, the signal converter can convert the radiofrequency signal into a baseband signal. In various aspects, such radiofrequency-to-baseband conversion can reduce a dispersion-induced distortion associated with driving the qubit.

According to one or more other embodiments, an apparatus is provided. The apparatus can comprise a qubit. In various aspects, the apparatus can further comprise a signal generator that can be operable to produce a radiofrequency signal. In various instances, the apparatus can further comprise a signal converter that can be coupled between the qubit and the signal generator. In various cases, the signal converter can be operable to convert the radiofrequency signal into a baseband signal.

According to one or more embodiments, the above-described system and/or apparatus can be implemented as a method.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
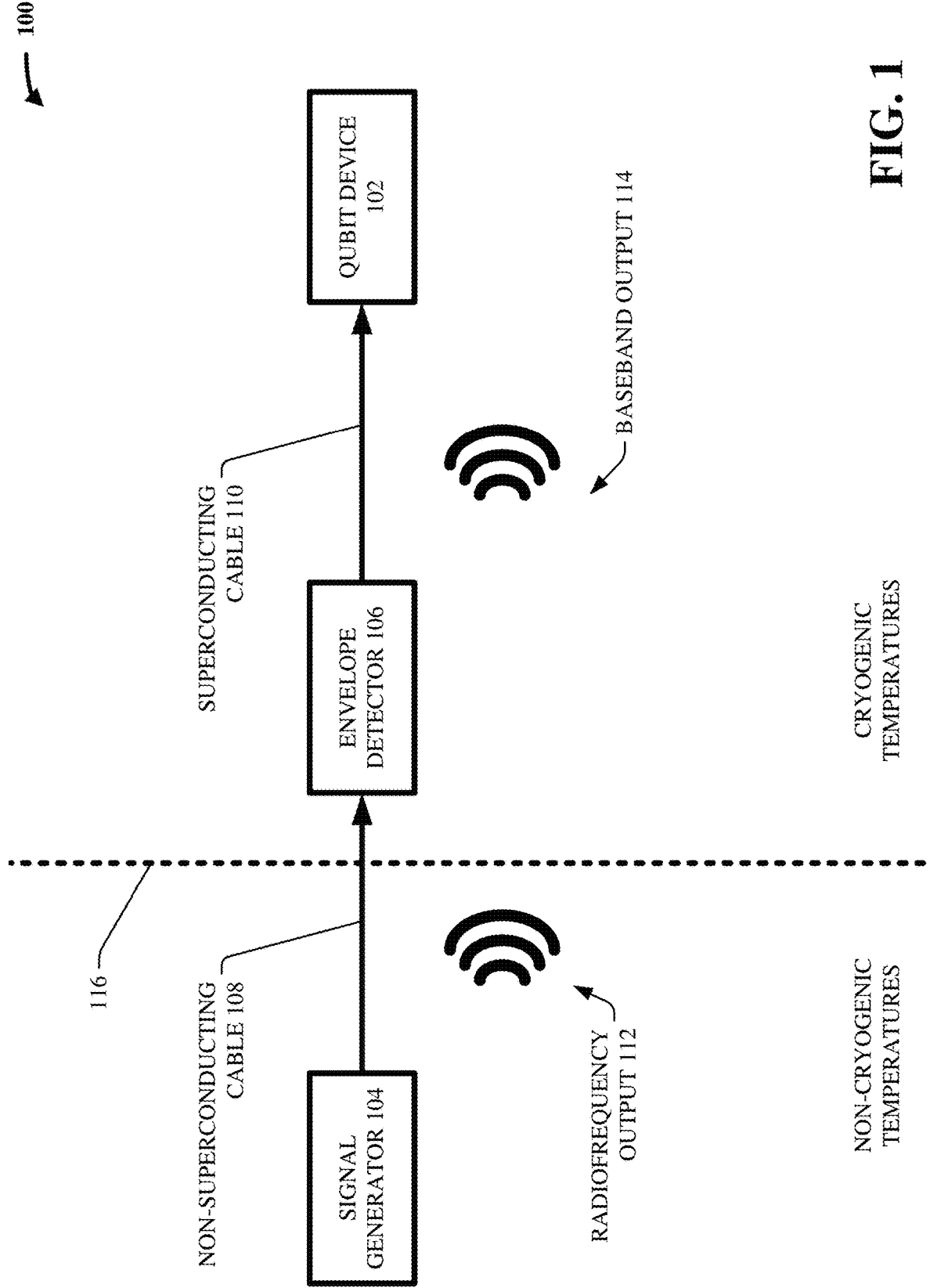
FIG. 1 illustrates a block diagram of an example, non-limiting system that facilitates mitigation of baseband pulse distortion via radiofrequency-to-baseband conversion in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In the field of quantum computing, qubit devices can be controlled and/or driven by baseband pulses. That is, quantum gate operations (e.g., Pauli-X gates, Pauli-Y gates, Pauli-Z gates, CNOT gates, Phase gates) can be applied to qubit devices (e.g., superconducting qubits, spin qubits, quantum dots) by exposing the qubit devices to baseband pulses, so as to facilitate flux-tuning of the qubit devices (e.g., a baseband pulse can generate an magnetic flux, which can control and/or modulate an operational frequency of a qubit device that is exposed to the magnetic flux).

Due to practical realities, such baseband pulses often must be transmitted through non-superconducting cables and/or wires. For instance, qubit devices are often located in cryogenic temperature stages and/or cryostats, in which superconducting cables/wires can be implemented (e.g., the vast majority of superconductivity transition temperatures are cryogenic). However, the electronic circuitry that controls such qubit devices is often located outside of such cryogenic temperature stages and/or cryostats, where superconducting cables/wires cannot be practicably implemented (e.g., few high-temperature superconductors exist, and those that do exist are prohibitively expensive and/or can be implemented only at environmental pressures that are orders of magnitude above atmospheric pressure). Accordingly, when such electronic circuitry generates baseband pulses to drive the qubit devices, such baseband pulses usually travel at least some distance through non-superconducting cables/wires.

When a baseband pulse is transmitted through a non-superconducting cable/wire, the baseband pulse can experience one or more dispersion-induced distortions. In particular, a baseband pulse propagating through a non-superconducting cable/wire can experience skin effect. The skin effect describes the tendency of a baseband pulse that is flowing through a non-superconducting cable/wire to exhibit a non-uniformly distributed current density along a lateral cross-section of the non-superconducting cable/wire (e.g., along a cross-section that is orthogonal to a longitudinal axis of the superconducting cable/wire). More specifically, when distorted by the skin effect, the current density of the baseband pulse can be greatest near the outer circumferential edge of the non-superconducting cable/wire and can exponentially decrease radially inward toward the center of the non-superconducting cable/wire. Unfortunately, the dispersion-induced distortions such as the skin effect can prevent the baseband pulse from reaching its intended amplitude and can cause the baseband pulse to have an exceedingly long settling time. Moreover, if a subsequent baseband pulse is transmitted through the non-superconducting cable/wire before a previous baseband pulse has fully settled, the subsequent baseband pulse can experience even further distortion, due to constructive interference with the previous baseband pulse (e.g., this constructive interference can be referred to as intersymbol interference).

Currently, there exist three techniques for ameliorating dispersion-induced distortions. The first technique includes inserting sufficiently long wait-times between consecutive baseband pulses (e.g., so as to ensure that a previous baseband pulse has fully settled before initiating a subsequent baseband pulse). Unfortunately, this first technique significantly reduces the number of baseband pulses, and thus the number of quantum gate operations, that can be applied to a qubit device within the coherence time of the qubit device (e.g., no baseband pulses, and thus no quantum gate operations, can be applied to the qubit device during such wait-times). The second technique includes applying deconvolution computations so as to identify a pre-distorted baseband pulse, such that the pre-distorted baseband pulse will take on an undistorted shape when exposed to the dispersion-induced distortion (e.g., that is, generating an initially-distorted baseband pulse which can achieve a desired shape when it is further distorted by the cable dispersion). However, this second technique is computationally intensive and difficult to implement in practice. Lastly, the third technique includes transmitting baseband pulses only along superconducting cables/wires (e.g., dispersion-induced distortions can be negligible in superconducting cables/wires). Unfortunately, this third technique is expensive and impractical for room-temperature electronics (e.g., as mentioned above, electronic circuitry for controlling qubit devices is often implemented at temperatures at which superconductivity is not exhibited).

Thus, systems and/or techniques that can address one or more of these technical problems can be desirable.

Various embodiments of the invention can address one or more of these technical problems. Specifically, various embodiments of the invention can provide systems and/or techniques that can facilitate mitigation of baseband pulse distortion via radiofrequency-to-baseband conversion. As those having ordinary skill in the art will appreciate, a baseband waveform can be any suitable electronic signal and/or electronic pulse that has a frequency near (e.g., within any suitable threshold margin of) zero. Accordingly, a baseband waveform can exhibit non-oscillatory shapes in the time-domain (e.g., rectangular shapes, ramped shapes, linear shapes). In contrast, a radiofrequency waveform can be any suitable electronic signal and/or electronic pulse that has a very large frequency (e.g., measured in giga-Hertz). Accordingly, a radiofrequency waveform can exhibit oscillatory shapes in the time-domain (e.g., sinusoidal shapes). Despite this contradiction between the oscillatory nature of radiofrequency waveforms and the non-oscillatory nature of baseband waveforms, the inventors of various embodiments described herein realized that a baseband waveform can be obtained by taking the envelope of a corresponding radiofrequency waveform. Moreover, the present inventors recognized that radiofrequency waveforms are not nearly as vulnerable to dispersion-induced distortions as are baseband waveforms. In other words, a baseband waveform that is propagating through a non-superconducting cable/wire can experience significant dispersion and/or distortion. On the other hand, a radiofrequency waveform that is propagating through the non-superconducting cable/wire can experience negligible dispersion and/or distortion. Accordingly, the present inventors recognized that dispersion-induced distortions, such as the skin effect, can be ameliorated and/or mitigated by refraining from transmitting baseband waveforms through non-superconducting cables/wires, and by instead transmitting radiofrequency waveforms at locations at which superconducting cables/wires are unavailable (e.g., at room temperature, outside of a cryostat) and subsequently converting such radiofrequency waveforms to corresponding baseband waveforms (e.g., by taking the envelopes of the radiofrequency waveforms) at locations at which superconducting cables/wires are available (e.g., inside of a cryostat).

In particular, various embodiments described herein can include a qubit device. In various aspects, the qubit device can be any suitable quantum computing structure and/or quantum computing architecture that can exhibit qubit behavior (e.g., that can take on a superposition of two basis states). For example, the qubit device can be a superconducting qubit (e.g., a phase qubit, a charge qubit, a flux qubit, a transmon qubit) that is made up of one or more Josephson junctions. As another example, the qubit device can be a spin qubit and/or a quantum dot. In some instances, the qubit device can be a single-qubit device. In other instances, the qubit device can be a multi-qubit device. In any case, the qubit device can include one or more qubits that can be flux-tuned by exposure to baseband waveforms. That is, the qubit device can include one or more qubits whose operational frequencies can be controllably modulated in response to exposure to magnetic fluxes that are generated by baseband waveforms.

In various aspects, various embodiments described herein can further include a signal generator that can drive the qubit device. In various instances, the signal generator can be any suitable computing device that can electronically and controllably generate radiofrequency waveforms. For example, the signal generator can be any suitable arbitrary waveform generator (AWG). As another example, the signal generator can be any suitable voltage oscillator.

In various aspects, various embodiments described herein can further include an envelope detector that is coupled between the signal generator and the qubit device. In various instances, the envelope detector can be any suitable computing device and/or circuit structure that can produce as output an envelope of an inputted oscillating electronic signal (e.g., that can produce as output an electronic signal that represents and/or follows the extremes and/or outline of the inputted oscillating electronic signal). For example, the envelope detector can be any suitable diode detector. As another example, the envelope detector can be any suitable precision detector. As still another example, the envelope detector can be any suitable Josephson junction detector. In any case, the envelope detector can receive as input a radiofrequency waveform produced by the signal generator, and the envelope detector can produce as output an envelope of the radiofrequency waveform. In various aspects, that envelope can be considered as equivalent to a baseband waveform.

More specifically, in various instances, a non-superconducting cable/wire can couple the signal generator to the envelope detector, and a superconducting cable/wire can couple the envelope detector to the qubit device. Accordingly, in various embodiments, the signal generator can produce a radiofrequency waveform, and the non-superconducting cable/wire can carry the radiofrequency waveform to the envelope detector. In various aspects, the envelope detector can produce as output a baseband waveform that is equivalent to and/or otherwise defined by the envelope of the radiofrequency waveform, and the superconducting cable/wire can carry the baseband waveform to the qubit device, where the baseband waveform can modulate and/or shift one or more operational frequencies of the qubit device.

Note that, as mentioned above, the radiofrequency waveform can be negligibly affected by dispersion-induced distortion when being transmitted through the non-superconducting cable/wire. Furthermore, note that, after the envelope detector generates the baseband waveform, the baseband waveform does not travel in any non-superconducting cables/wires, which means that the baseband waveform can also be unaffected by dispersion-induced distortion. Accordingly, since neither the radiofrequency waveform nor the baseband waveform can be distorted by cable dispersion, the qubit device can be driven by the signal generator without distortion by cable dispersion (e.g., without having to implement wait times and/or signal deconvolution computations).

In various aspects, the signal generator can controllably adjust the radiofrequency waveform (e.g., the amplitude, frequency, and/or phase of the radiofrequency waveform), such that the baseband waveform produced by the envelope detector exhibits desired characteristics (e.g., a desired amplitude, a desired shape). For example, suppose that it is desired to expose the qubit device to a baseband waveform having a particular shape (e.g., a rectangular shape having a specified amplitude and a specified duration). In such case, this can be achieved by producing, via the signal generator, a radiofrequency waveform whose envelope exhibits that particular shape (e.g., whose envelope exhibits the rectangular shape having the specified amplitude and the specified duration), and then feeding, by the non-superconducting cable/wire, such shaped radiofrequency waveform to the envelope detector. In various cases, based on receiving the shaped radiofrequency waveform, the envelope detector can generate an electronic signal that matches and/or is equivalent to the envelope of the shaped radiofrequency waveform. Accordingly, the electronic signal outputted by the envelope detector can be considered as a baseband waveform that exhibits the particular shape (e.g., that exhibits the rectangular shape having the specified amplitude and the specified duration). In this way, controllably adjusting characteristics of the radiofrequency waveform that is produced by the signal generator can cause commensurate adjustments in the characteristics of the baseband waveform that is produced by the envelope detector.

In some embodiments, the radiofrequency waveform produced by the signal generator can be a rectangular radiofrequency pulse (e.g., an oscillatory pulse that ramps up from a zero baseline amplitude to any suitable threshold amplitude within a rise time that is on the order of nanoseconds). Because the baseband waveform produced by the envelope detector can take on the shape of the envelope of the radiofrequency waveform, the baseband waveform in such case can be a rectangular baseband pulse (e.g., a non-oscillatory pulse that ramps up from the zero baseline amplitude to the threshold amplitude within the rise time).

In other embodiments, the radiofrequency waveform produced by the signal generator can be a rectangular radiofrequency offset pulse (e.g., an oscillatory pulse that ramps up (and/or ramps down) from any suitable non-zero baseline amplitude to any suitable threshold amplitude within a rise time that is on the order of nanoseconds). Again, because the baseband waveform produced by the envelope detector can take on the shape of the envelope of the radiofrequency waveform, the baseband waveform in such case can be a rectangular baseband offset pulse (e.g., a non-oscillatory pulse that ramps up (and/or ramps down) from the non-zero baseline amplitude to the threshold amplitude within the rise time).

In various other embodiments, the baseband waveform can be converted into a rectangular baseband offset pulse via a bias-tee (and/or a resistive-tee) and a constant baseband signal. More specifically, in such embodiments, there can be a bias-tee that is coupled between the envelope detector and the qubit device by superconducting cables/wires, and there can be a second signal generator that is coupled to the bias-tee by either superconducting or non-superconducting cables/wires. In various aspects, the radiofrequency waveform produced by the signal generator can be a rectangular radiofrequency pulse, which can cause the baseband waveform produced by the envelope detector to be a rectangular baseband pulse. In various cases, the baseband waveform (e.g., the rectangular baseband pulse) can be routed to the bias-tee. Moreover, in various instances, the second signal generator can produce a constant baseband signal that is also routed to the bias-tee. Accordingly, in various aspects, the bias-tee can combine, add, and/or otherwise superimpose the baseband waveform (e.g., the rectangular baseband pulse) onto the constant baseband signal. The result of such combination, addition, and/or superimposition can be a rectangular baseband offset pulse that ramps up (and/or ramps down) from any suitable non-zero baseline amplitude to any suitable threshold amplitude within any suitable rise time, where the non-zero baseline amplitude can be equal to the amplitude of the constant baseband signal, where the threshold amplitude can be equal to the sum (and/or difference) between the amplitude of the constant baseband signal and the amplitude of the baseband waveform, and where the rise time of the rectangular baseband offset pulse can be equal to the rise time of the baseband waveform.

In still other embodiments, the baseband waveform can be converted into a rectangular baseband offset pulse via a bias-tee (and/or resistive-tee) and a constant radiofrequency signal. More specifically, in such embodiments, there can be a bias-tee that is coupled between the envelope detector and the qubit device by superconducting cables/wires. Furthermore, there can be a second signal generator that is coupled by non-superconducting cables/wires to a second envelope detector, where the second envelope detector is coupled to the bias-tee by additional non-superconducting cables/wires. In various aspects, the radiofrequency waveform produced by the signal generator can be a rectangular radiofrequency pulse, which can cause the baseband waveform produced by the envelope detector to be a rectangular baseband pulse. In various instances, the baseband waveform (e.g., the rectangular baseband pulse) can be routed to the bias-tee. Moreover, in various cases, the second signal generator can produce a constant radiofrequency signal that is routed to the second envelope detector. In various aspects, the second envelope detector can output a constant baseband signal that is given and/or defined by the envelope of the constant radiofrequency signal. In various aspects, the constant baseband signal can be routed to the bias-tee. Accordingly, in various aspects, the bias-tee can combine, add, and/or otherwise superimpose the baseband waveform (e.g., the rectangular baseband pulse) onto the constant baseband signal, thereby yielding a rectangular baseband offset pulse, as described above.

Because various embodiments described herein utilize radiofrequency waveforms, frequency-based multiplexing can be implemented in various scenarios to reduce a number and/or length of non-superconducting cables. For example, suppose that there is a second qubit device, a second signal generator that drives the second qubit device, and a second envelope detector that is coupled between the second signal generator and the second qubit device. Furthermore, suppose that both the signal generator and the second signal generator are coupled by non-superconducting cables/wires to a multiplexer, suppose that the multiplexer is coupled by a non-superconducting cable/wire to a demultiplexer, and suppose that the demultiplexer is coupled by non-superconducting cables/wires to both the envelope detector and the second envelope detector. In various aspects, the signal generator can produce the radiofrequency waveform, as described above. Moreover, in various instances, the second signal generator can produce a second radiofrequency waveform. In various cases, the second radiofrequency waveform can have a distinct and/or unique frequency as compared to the radiofrequency waveform. In various aspects, the multiplexer can multiplex (e.g., combine, superimpose) the radiofrequency waveform and the second radiofrequency waveform together, thereby yielding a multiplexed radiofrequency waveform. In various instances, the multiplexed radiofrequency waveform can propagate through the non-superconducting cable/wire that couples the multiplexer to the demultiplexer. In various cases, the demultiplexer can demultiplex (e.g., separate) the multiplexed radiofrequency waveform back into the radiofrequency waveform and the second radiofrequency waveform (e.g., due to their distinct and/or unique frequencies). In various aspects, the radiofrequency waveform can be routed from the demultiplexer to the envelope detector, which can generate the baseband waveform that matches the envelope of the radiofrequency waveform, so as to flux-tune the qubit device. Similarly, in various instances, the second radiofrequency waveform can be routed from the demultiplexer to the second envelope detector, which can generate a second baseband waveform that matches the envelope of the second radiofrequency waveform, so as to flux-tune the second qubit device. By implementing frequency-based multiplexing in this way, more than one qubit device can be flux-tuned without interference from dispersion-induced dispersions, notwithstanding that only a single non-superconducting cable/wire couples the multiplexer to the demultiplexer. In other words, implementation of multiplexing allows for a reduction in the number and/or length of cables/wires required to perform flux-tuning of multiple qubit devices. Note that such multiplexing could not be implemented if only baseband waveforms were used (e.g., if radiofrequency waveforms and envelope detectors were omitted).

Therefore, various embodiments described herein include the implementation of an envelope detector between a signal generator and a qubit device. More specifically, the envelope detector can be coupled to the signal generator via a non-superconducting cable/wire, and the qubit device can be coupled to the envelope detector via a superconducting cable/wire. In various aspects, the signal generator can produce a radiofrequency waveform that is carried by the non-superconducting cable/wire to the envelope detector, the envelope detector can produce a baseband waveform that matches the shape of the envelope of the radiofrequency waveform, and the baseband waveform can be carried by the superconducting cable/wire to the qubit device to facilitate flux-tuning. The radiofrequency waveform can experience negligible dispersion-induced distortion when propagating through the non-superconducting cable/wire, and the baseband waveform can experience negligible skin dispersion-induced distortion when propagating through the superconducting cable/wire. Accordingly, due to the radiofrequency-to-baseband conversion that is performed by the envelope detector, the qubit device can be driven (e.g., flux-tuned) without interference and/or distortion from cable dispersion such as skin effect.

Various embodiments of the invention can be employed to use hardware and/or software to solve problems that are highly technical in nature (e.g., to facilitate mitigation of baseband pulse distortion via radiofrequency-to-baseband conversion), that are not abstract, that are not mere laws of nature, that are not mere natural phenomena, and that cannot be performed as a set of mental acts by a human. Instead, various embodiments described herein include tangible circuit structures/architectures and/or methodologies pertaining to such tangible circuit structures/architectures that can be implemented so as to reduce, mitigate, and/or ameliorate the technical problem of dispersion-induced distortion.

Indeed, as mentioned above, existing systems/techniques for driving a qubit device include generating a baseband pulse via room-temperature electronics, transmitting the baseband pulse through at least some length of non-superconducting cable/wire (e.g., superconductivity cannot yet be practicably and/or cost-effectively implemented at room temperature), and exposing the qubit device to the baseband pulse so as to flux-tune the qubit device. When the baseband pulse propagates through the non-superconducting cable/wire in such existing systems/techniques, the baseband pulse experiences distortion due to cable dispersion, and such distortion prevents the qubit device from being optimally driven. As also mentioned above, such existing systems/techniques attempt to address the cable dispersion problem via the insertion of wait-times between consecutive baseband pulses and/or the implementation of deconvolution computations to pre-distort the baseband pulses. Unfortunately, both of these solutions are suboptimal (e.g., wait-time insertion drastically reduces the number of quantum gate operations that can be applied to the qubit device within the coherence time of the qubit device, and baseband deconvolution is computationally expensive).

In stark contrast, various embodiments described herein can address the cable dispersion problem without requiring exceedingly long wait times or complicated deconvolution computations. Specifically, systems/techniques described herein can include generating a radiofrequency pulse via room-temperature electronics, transmitting the radiofrequency pulse through a non-superconducting cable/wire to a location at which superconducting cables/wires can be implemented, converting at that location the radiofrequency pulse into a baseband pulse via an envelope detector, and transmitting the baseband pulse to the qubit device via a superconducting cable/wire so as to flux-tune the qubit device. Unlike baseband pulses, radiofrequency pulses can be negligibly distorted by cable dispersion when propagating through a non-superconductor. Moreover, unlike during propagation through a non-superconductor, baseband pulses can be negligibly distorted by cable dispersion when propagating through a superconductor. Accordingly, the radiofrequency pulse produced by the signal generator and the baseband pulse produced by the envelope detector can both be negligibly distorted by cable dispersion. In other words, by implementing the envelope detector between the signal generator and the qubit device as described herein, dispersion-induced distortion can be significantly reduced, which can eliminate the need for wait-time insertion and/or baseband deconvolution. Because various embodiments described herein can mitigate dispersion-induced distortion (e.g., skin effect) that normally interferes with flux-tuning of qubit devices, and because such embodiments can achieve this goal without requiring long wait-times or complicated baseband deconvolution computations, such embodiments certainly constitute a tangible technical improvement in the field of quantum computing.

Moreover, it must be emphasized that various embodiments described herein are not directed to mere transitory signals and/or propagating waveforms. As explained herein, various embodiments of the invention can solve the technical problem of dispersion-induced distortion, which distorts baseband pulses that are transmitted through non-superconductors. Specifically, the technical problem of dispersion-induced distortion can be solved by transmitting radiofrequency pulses at locations at which superconducting cables are unavailable (e.g., at room-temperature), and subsequently converting such radiofrequency pulses to baseband pulses, via envelope detectors, at locations at which superconducting cables are available. Accordingly, various embodiments of the invention cannot be intelligently explained without discussing/describing radiofrequency waveforms, signals, and/or pulses that propagate through non-superconducting cables/wires and/or without discussing/describing baseband waveforms, signals, and/or pulses that propagate through superconducting cables/wires. Despite such description/discussion of radiofrequency and/or baseband waveforms, various embodiments of the invention are not directed to such radiofrequency and/or baseband waveforms. Instead, such embodiments are directed to the concrete, tangible, and non-transitory circuit structures/architectures that generate, convert, and/or react to such radiofrequency and/or baseband waveforms (e.g., signal generator, such as AWG or voltage oscillator; envelope detector, such as diode detector or Josephson junction detector; qubit device, such as superconducting qubit or quantum dot).

Furthermore, various embodiments of the invention can control tangible, hardware-based, and/or software-based devices based on the disclosed teachings. For example, embodiments of the invention can include tangible signal generators that are coupled to tangible envelope detectors via tangible non-superconducting cables/wires, and tangible qubit devices that are coupled to the tangible envelope detectors via tangible superconducting cables/wires.

It should be appreciated that the figures and the herein disclosure describe non-limiting examples of various embodiments of the invention.

FIG. 1 illustrates a block diagram of an example, non-limiting system 100 that can facilitate mitigation of baseband pulse distortion via radiofrequency-to-baseband conversion in accordance with one or more embodiments described herein. As shown, there can be a qubit device 102, a signal generator 104, and/or an envelope detector 106.

In various embodiments, the qubit device 102 can include any suitable quantum computing substrate on which one or more qubits are fabricated. For example, the qubit device 102 can include any suitable number of silicon wafers on which one or more superconducting qubits (e.g., flux qubits, charge qubits, phase qubits, transmon qubits) are fabricated. As another example, the qubit device 102 can include any suitable number of silicon wafers on which one or more spin qubits are fabricated. As still another example, the qubit device 102 can include any suitable number of silicon wafers on which one or more quantum dots are fabricated. As yet another example, the qubit device 102 can include any suitable number of silicon wafers on which any suitable combination of superconducting qubits, spin qubits, and/or quantum dots are fabricated. In any case, the qubit device 102 can be driven and/or otherwise flux-tuned by being exposed to baseband waveforms. That is, the operational frequencies of the one or more qubits of the qubit device 102 can be controllably altered and/or adjusted by exposing the qubit device 102 to baseband waveforms (e.g., a baseband waveform can change the gate voltage (plunger gate voltage, exchange gate voltage, tunnel gate voltage) of a qubit). Furthermore, in various aspects, the qubit device 102 can be implemented at any suitable cryogenic temperature (e.g., can be located inside of a cryostat where superconductivity can be achieved). As those having ordinary skill in the art will appreciate, the qubit device 102 can be manufactured via any suitable microfabrication and/or nanofabrication techniques, such as photolithography, deposition, and/or double-angle evaporation.

In various embodiments, the signal generator 104 can be any suitable circuit device that can electronically generate and/or produce radiofrequency waveforms. As an example, the signal generator 104 can be any suitable AWG. As another example, the signal generator 104 can be any suitable voltage oscillator and/or current oscillator. In any case, the signal generator 104 can controllably modulate the amplitude, frequency, and/or phase of any suitable radiofrequency waveform that is outputted by the signal generator 104. In various instances, the signal generator 104 can be implemented at any suitable non-cryogenic temperature (e.g., the signal generator 104 can be considered as a room-temperature electronic device, and so the signal generator 104 can be implemented outside of a cryostat).

In various embodiments, the envelope detector 106 can be any suitable circuit device that can electronically identify an envelope of an inputted radiofrequency waveform. For example, the envelope detector 106 can be any suitable diode detector, such as a tunnel diode detector or a Schottky diode detector. As another example, the envelope detector 106 can be any suitable Josephson junction detector. As yet another example, the envelope detector 106 can be any suitable circuit mixer. In any case, the envelope detector 106 can receive as input a radiofrequency waveform (e.g., an oscillatory signal) and can produce as output a baseband waveform (e.g., a non-oscillatory signal), where the shape of the baseband waveform can match and/or otherwise be based on the envelope (e.g., the upper envelope and/or the lower envelope) of the inputted radiofrequency waveform. In various aspects, the envelope detector 106 can be implemented at any suitable cryogenic temperature (e.g., such as inside of a cryostat).

In various embodiments, as shown, the signal generator 104 can be coupled to the envelope detector 106 via a non-superconducting cable 108. In various aspects, the non-superconducting cable 108 can be any suitable electric wire that is resistive and/or that otherwise does not exhibit superconductivity.

In various embodiments, as shown, the envelope detector 106 can be coupled to the qubit device 102 via a superconducting cable 110. In various aspects, the superconducting cable 110 can be any suitable electric wire that is not resistive and/or that otherwise exhibits superconductivity.

In various embodiments, as shown, the signal generator 104 can electronically produce a radiofrequency output 112. In various aspects, the radiofrequency output 112 can be any suitable oscillatory waveform, signal, and/or pulse that can exhibit any suitable amplitude, any suitable frequency, any suitable phase, and/or any suitable duration. In various instances, the non-superconducting cable 108 can carry and/or conduct the radiofrequency output 112 to the envelope detector 106. Accordingly, in various cases, the non-superconducting cable 108 can be considered as representing a signal path (and/or otherwise being located in a signal path) between the signal generator 104 and the envelope detector 106.

In various embodiments, as shown, the envelope detector 106 can electronically produce a baseband output 114 in response to and/or otherwise based on the radiofrequency output 112. More specifically, in various aspects, the baseband output 114 can be any suitable non-oscillatory waveform, signal, and/or pulse the shape of which matches and/or is equivalent to the envelope (e.g., the upper envelope and/or the lower envelope) of the radiofrequency output 112. In other words, the baseband output 114 can, in various instances, exhibit the same amplitude and/or the same duration as the radiofrequency output 112. However, because the baseband output 114 can be non-oscillatory, the baseband output 114 can, in various cases, exhibit no frequency of oscillation and/or no phase of oscillation.

In various embodiments, as shown, the superconducting cable 110 can carry and/or conduct the baseband output 114 to the qubit device 102. Accordingly, in various cases, the superconducting cable 110 can be considered as representing a signal path (and/or otherwise being located in a signal path) between the envelope detector 106 and the qubit device 102. In various aspects, the qubit device 102 can be driven and/or flux-tuned by the baseband output 114 (e.g., operational frequencies of the one or more qubits of the qubit device 102 can change and/or modulate in response to exposure to the baseband output 114).

In various cases, the numeral 116 can indicate a boundary between non-cryogenic temperatures and/or cryogenic temperatures of the system 100. That is, the numeral 116 can indicate a boundary of a cryostat (not shown) inside which and/or outside which various components of the system 100 can be implemented. For example, non-cryogenic temperatures can exist to the left of the numeral 116. That is, in various aspects, the signal generator 104 and/or some portion of the non-superconducting cable 108 can exist and/or be implemented outside of the cryostat (e.g., where superconductivity cannot practicably be achieved). As another example, cryogenic temperatures can exist to the right of the numeral 116. That is, in various instances, a remaining portion of the non-superconducting cable 108, the envelope detector 106, the superconducting cable 110, and/or the qubit device 102 can exist and/or be implemented inside of the cryostat (e.g., where superconductivity can practicably be achieved). Those having ordinary skill in the art will appreciate that any suitable number of temperature stages can be implemented as desired (e.g., the left of the numeral 116 can include one or more distinct non-cryogenic temperature stages; the right of the numeral 116 can include one or more distinct cryogenic temperature stages).

As mentioned above, a baseband waveform that propagates through a non-superconductor can experience dispersion-induced distortion, such as the skin effect. In contrast, and as experimentally and computationally verified by the present inventors, a radiofrequency waveform that propagates through a non-superconductor can experience negligible dispersion-induced distortion. Accordingly, the radiofrequency output 112 that propagates through the non-superconducting cable 108 can be considered as not being affected and/or distorted by the cable dispersion (e.g., skin effect). Moreover, as mentioned above, a baseband waveform that propagates through a superconductor can experience negligible dispersion-induced distortion. Accordingly, the baseband output 114 that propagates through the superconducting cable 110 can also be considered as not being affected and/or distorted by cable dispersion. Therefore, the system 100 as shown in FIG. 1 can be considered as enabling the signal generator 104 to drive and/or flux-tune the qubit device 102, without such driving and/or flux-tuning being negatively influenced by dispersion-induced distortion. Furthermore, note that the signal generator 104 can drive and/or flux-tune the qubit device 102 without inserting a wait-time before and/or after the radiofrequency output 112 and/or without applying deconvolution techniques to the radiofrequency output 112, unlike existing systems/techniques. In other words, the system 100 constitutes a concrete and tangible technical improvement over existing systems/techniques.

Figure 2:
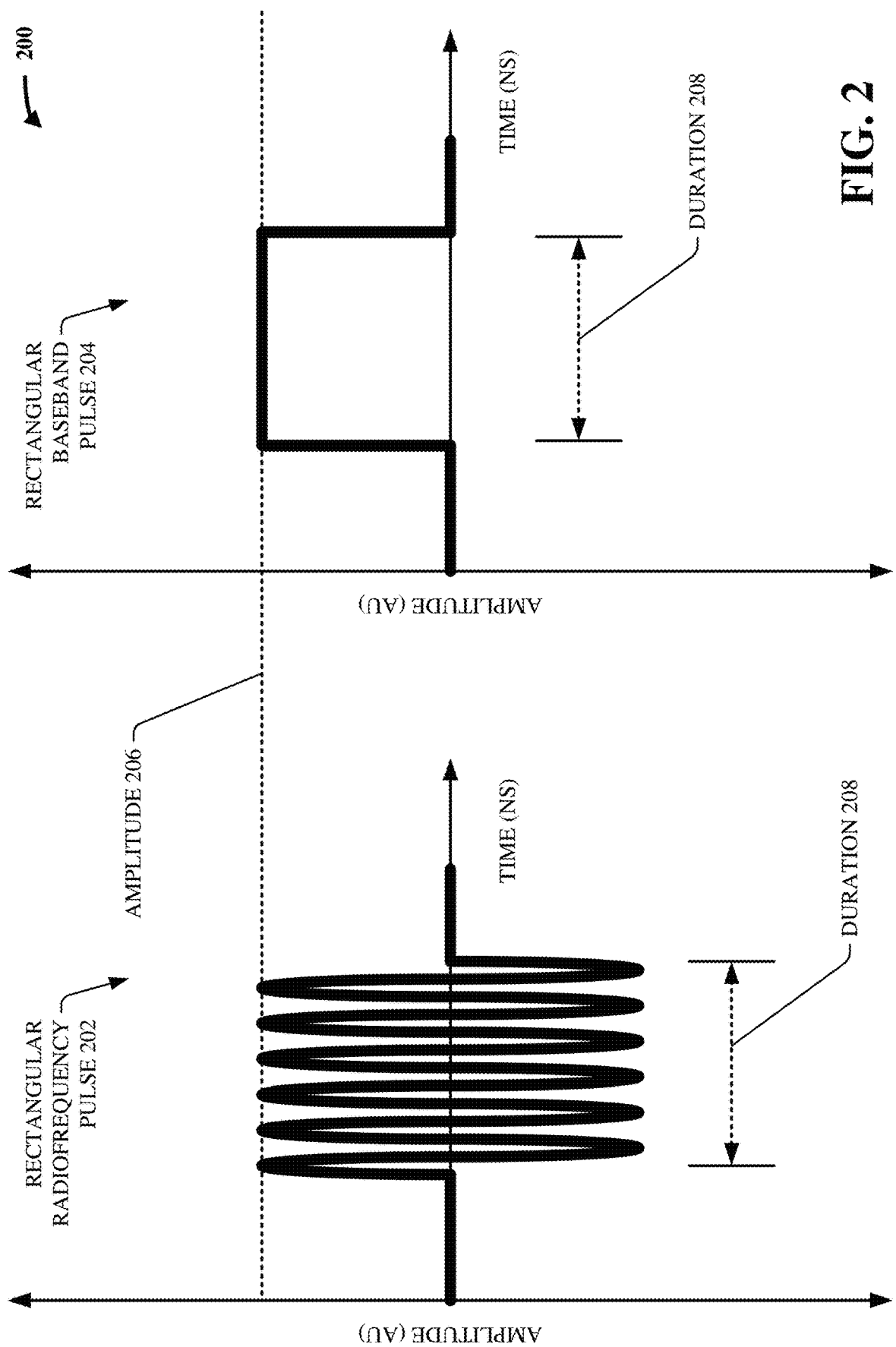
FIG. 2 illustrates example, non-limiting graphs of a rectangular radiofrequency pulse and a corresponding rectangular baseband pulse in accordance with one or more embodiments described herein.

FIG. 2 illustrates example, non-limiting graphs 200 of a rectangular radiofrequency pulse and a corresponding rectangular baseband pulse in accordance with one or more embodiments described herein. That is, FIG. 2 depicts non-limiting example embodiments of the radiofrequency output 112 and the baseband output 114, to help clarify how the envelope detector 106 can function.

In various embodiments, the radiofrequency output 112 can be a rectangular radiofrequency pulse 202. As shown, the rectangular radiofrequency pulse 202 can be an oscillatory waveform having an amplitude 206 (e.g., as compared to a baseline amplitude of zero) and a duration 208. Those having ordinary skill in the art will appreciate that the amplitude 206 and/or the duration 208 can have any suitable magnitudes. Although not explicitly shown in FIG. 2, those having ordinary skill in the art will further appreciate that the rectangular radiofrequency pulse 202 can have any suitable rise time (e.g., time to ramp up from the baseline amplitude of zero to the amplitude 206), such as one nanosecond.

In various embodiments, when the radiofrequency output 112 is the rectangular radiofrequency pulse 202, the baseband output 114 can be the rectangular baseband pulse 204. In other words, when the envelope detector 106 receives as input the rectangular radiofrequency pulse 202, the envelope detector 106 can produce as a response the rectangular baseband pulse 204. As shown, the rectangular baseband pulse 204 can be a non-oscillatory waveform the shape of which, in this non-limiting example, matches and/or is equivalent to the upper envelope of the rectangular radiofrequency pulse 202. More specifically, the rectangular baseband pulse 204 can have the same (e.g., within any suitable threshold margin) amplitude as the rectangular radiofrequency pulse 202 (e.g., the amplitude 206), and the rectangular baseband pulse 204 can have the same (e.g., within any suitable threshold margin) duration as the rectangular radiofrequency pulse 202 (e.g., the duration 208). Although not explicitly shown in FIG. 2, the rectangular baseband pulse 204 can also have the same (e.g., within any suitable threshold margin) rise time as the rectangular radiofrequency pulse 202. However, the rectangular baseband pulse 204 can, as shown, not exhibit the same oscillatory frequency or the same oscillatory phase as the rectangular radiofrequency pulse 202.

Accordingly, in various aspects, the characteristics (e.g., amplitude, duration, rise time) of the rectangular baseband pulse 204 (and/or the baseband output 114 more generally) can be controllably adjusted by controlling the characteristics of the rectangular radiofrequency pulse 202 (and/or the radiofrequency output 112 more generally).

By implementing the radiofrequency output 112 and the envelope detector 106, the qubit device 102 can be driven by the signal generator 104 without negative influence of dispersion-induced distortion (e.g., without the skin effect).

In contrast, if the radiofrequency output 112 and the envelope detector 106 were not implemented (e.g., if the signal generator 104 instead generated the baseband output 114 and transmitted it to the qubit device 102), the baseband output 114 would have to propagate through at least some non-zero length of non-superconducting cable and would thus become distorted by dispersion-induced distortion (e.g., would become distorted by the skin effect). Skin effect distortion in particular is further explained with respect to FIGS. 3-4.

Figure 3:
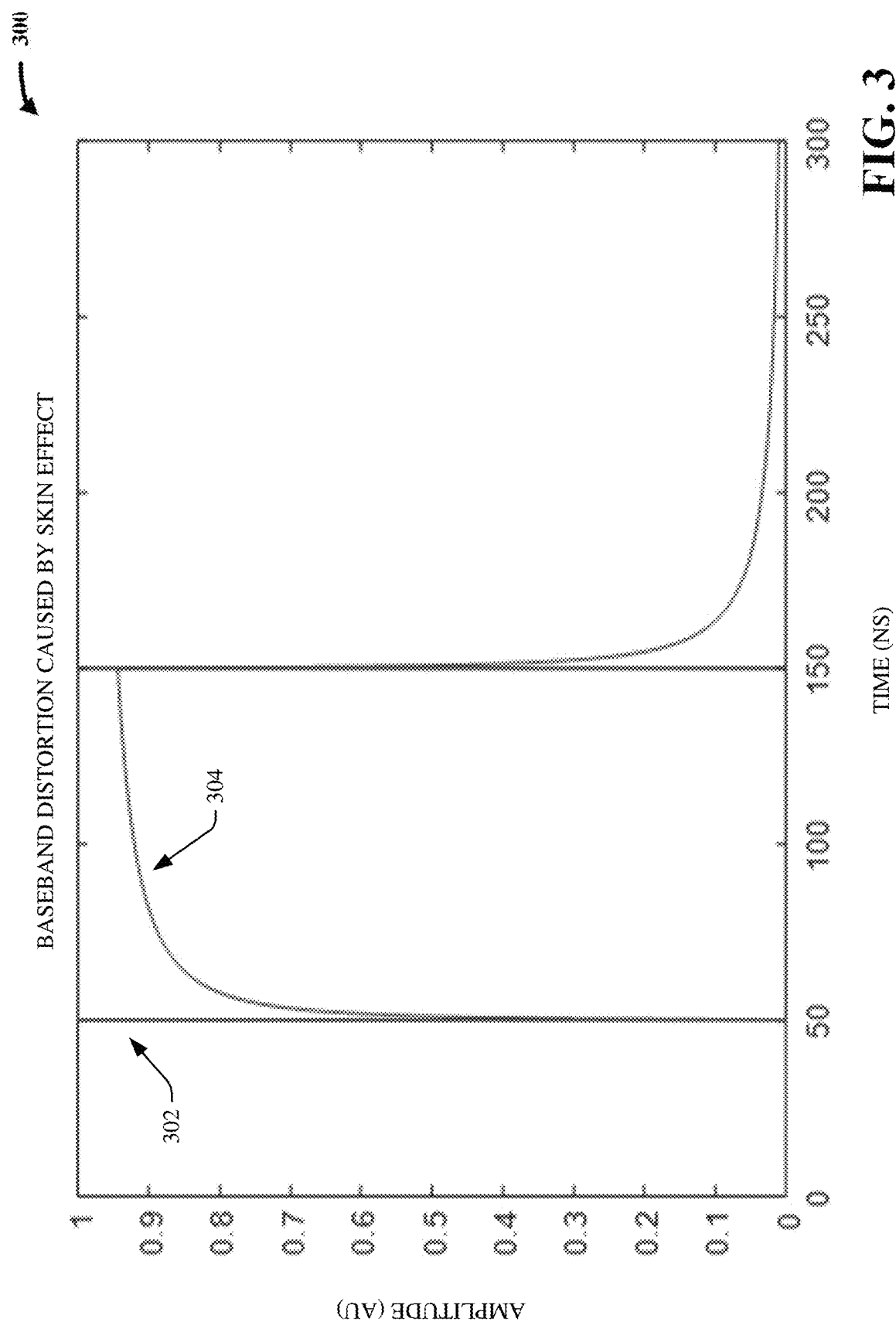
FIGS. 3-4 illustrate example, non-limiting graphs showing a skin effect distortion that can adversely affect baseband pulses.
Figure 4:
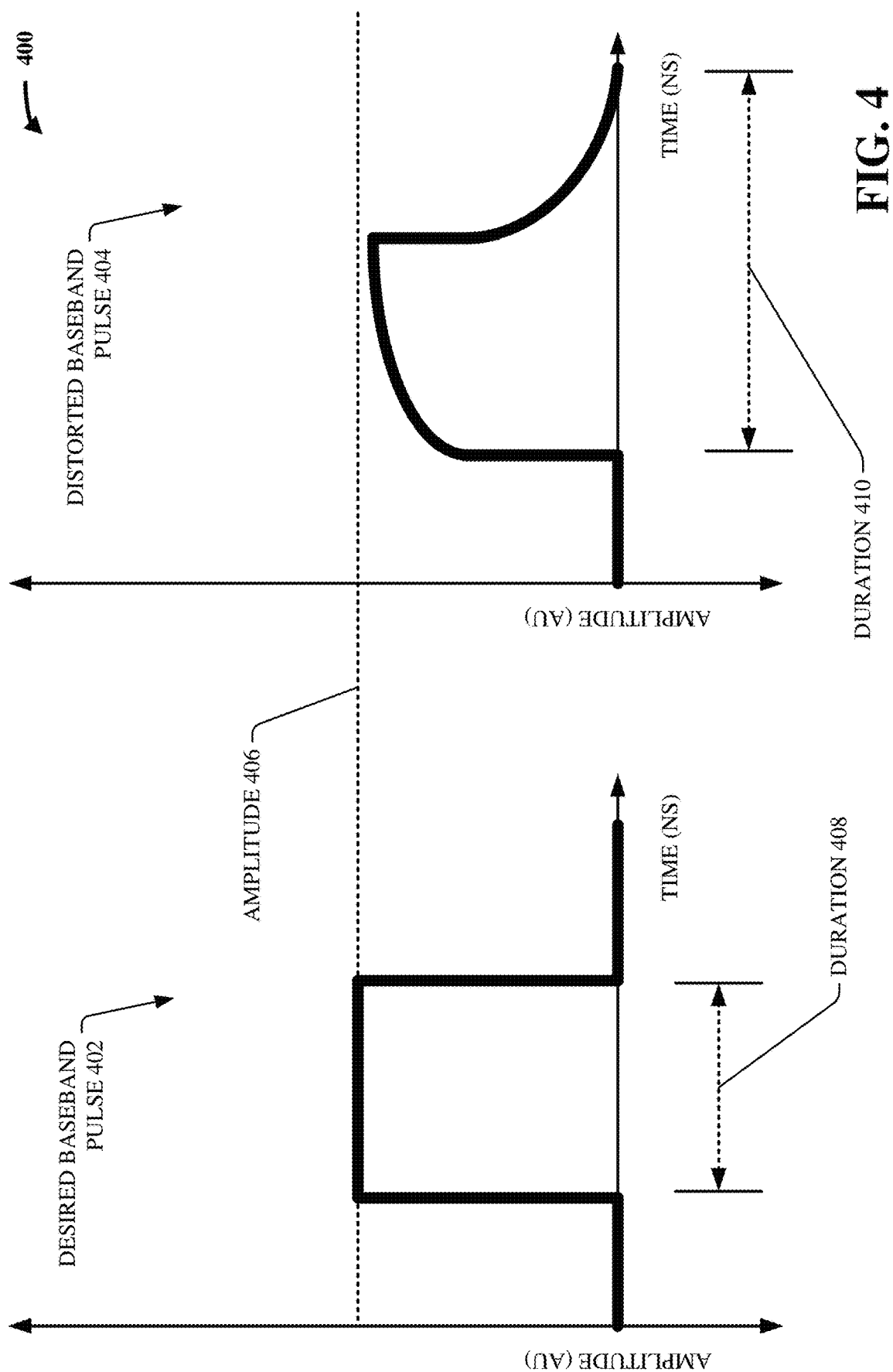

FIGS. 3-4 illustrate example, non-limiting graphs 300 and 400 showing a skin effect distortion that can adversely affect baseband pulses. In particular, FIG. 3 depicts experimental results obtained by the present inventors, and FIG. 4 depicts illustrations for added clarity.

As shown in FIG. 3, the graph 300 depicts a desired rectangular baseband pulse 302 (shown in blue) and a distorted rectangular baseband pulse 304 (shown in red). In various aspects, as shown, the desired rectangular baseband pulse 302 is at a baseline amplitude of zero from 0 nanoseconds to about 50 nanoseconds, the desired rectangular baseband pulse 302 ramps up to an amplitude of 1 (e.g., measured in arbitrary units (AU)) at about 50 nanoseconds, the desired rectangular baseband pulse 302 maintains the amplitude of 1 until about 150 nanoseconds, and the desired rectangular baseband pulse 302 ramps back down to the baseline amplitude of zero at about 150 nanoseconds. In various instances, the desired rectangular baseband pulse 302 can be considered as a baseband pulse that has not been transmitted and/or propagated through a non-superconductor.

In stark contrast, the distorted rectangular baseband pulse 304 can be considered as the result obtained when the desired rectangular baseband pulse 302 is transmitted and/or propagated through a non-superconductor. As shown, the distorted rectangular baseband pulse 304 is at the baseline amplitude of zero from 0 nanoseconds to about 50 nanoseconds, the distorted rectangular baseband pulse 304 ramps up at about 50 nanoseconds, the distorted rectangular baseband pulse 304 asymptotically approaches the amplitude of 1 until about 150 nanoseconds, the distorted rectangular baseband pulse 304 ramps down at about 150 nanoseconds, and the distorted rectangular baseband pulse 304 asymptotically settles back to the baseline amplitude of zero from about 150 nanoseconds to about 300 nanoseconds. As can be seen, the distorted rectangular baseband pulse 304 does not exhibit the clean rectangular shape of the desired rectangular baseband pulse 302. Indeed, the distorted rectangular baseband pulse 304 has a diminished peak (e.g., as shown between the 50 nanosecond mark and the 150 nanosecond mark) and an exceedingly long tail and/or settling time (e.g., as shown between the 150 nanosecond mark and the 300 nanosecond mark).

FIG. 4 shows separate illustrations of desired and distorted rectangular baseband pulses, for added clarity. In various aspects, a desired baseband pulse 402 can be considered as a rectangular baseband pulse that maintains a desired rectangular shape when being transmitted/propagated through a superconducting cable/wire. As shown, the desired baseband pulse 402 can have an amplitude 406 and/or a duration 408, having any suitable magnitudes. In contrast, a distorted baseband pulse 404 can be considered as a rectangular baseband pulse that fails to maintain a desired rectangular shape due to skin effect distortion when being transmitted/propagated through a non-superconducting cable/wire. As shown, the distorted baseband pulse 404 can fail to fully reach the amplitude 406 and/or can have an excessively long duration 410.

Figure 5:
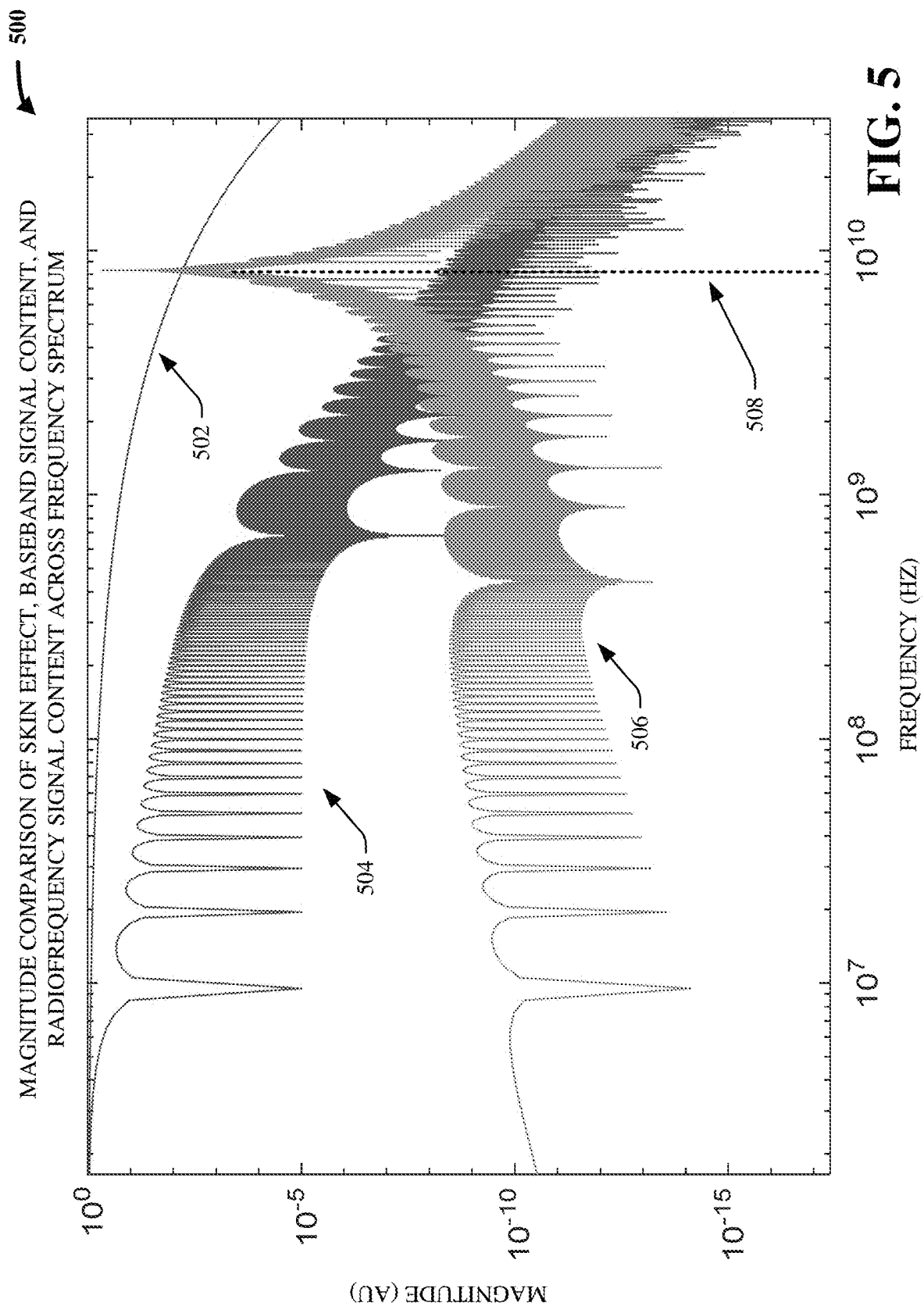
FIG. 5 illustrates an example, non-limiting graph that compares the magnitudes of skin effect distortion, baseband signal content, and radiofrequency signal content across a frequency spectrum.

FIG. 5 illustrates an example, non-limiting graph 500 that compares the magnitudes of skin effect distortion, baseband signal content, and radiofrequency signal content across a frequency spectrum.

As shown, the graph 500 depicts a curve 502, a curve 504, and a curve 506. In various aspects, the curve 502 can represent the magnitude of distortion imparted onto a waveform by skin effect. In various instances, the curve 502 can be given by the magnitude of the formula $H(\omega)=e^{-\sqrt{i\omega\tau}}$, where $i=\sqrt{-1}$, where $\tau$ represents the rise time of the waveform that is subjected to skin effect, where $\omega$ represents a frequency of the waveform that is subjected to skin effect, and where H represents the distortion of the waveform that is subjected to skin effect. As shown by both this formula and the curve 502, the magnitude of skin effect distortion is greatest for low-frequency waveforms (e.g., baseband waveforms) and lowest for high frequency waveforms (e.g., radiofrequency waveforms).

In various aspects, the curve 504 can represent the content and/or magnitude of a baseband waveform (e.g., having $\omega$ near zero). As can be seen, the curve 504 is entirely beneath the curve 502 across the frequency spectrum, meaning that the content and/or magnitude of a baseband waveform that is subjected to skin effect can be significantly distorted and/or eclipsed by the skin effect. On other hand, in various instances, the curve 506 can represent the content and/or magnitude of a radiofrequency waveform (e.g., having $\omega$ very large, on the order of giga-Hertz). In the non-limiting example of FIG. 5, the radiofrequency waveform represented by the curve 506 has a carrier frequency of about 8 giga-Hertz, as indicated by the numeral 508. As shown, the curve 506 is not entirely beneath the curve 502 across the frequency spectrum; indeed, the curve 506 is actually above the curve 502 around a frequency of 8 giga-Hertz (e.g., numeral 508), which is the carrier frequency of the radiofrequency waveform represented by the curve 506. Stated more generally, the bulk and/or majority of frequency content for a radiofrequency waveform is at its carrier frequency; since the carrier frequency of a radiofrequency waveform can be very large (e.g., measured in giga-Hertz), and since the magnitude of skin effect distortion decreases at very large frequencies, a radiofrequency waveform can be much less vulnerable to skin effect distortion, as compared to a baseband waveform. Indeed, a radiofrequency waveform that is subjected to skin effect can experience negligible distortion.

By plotting the graph 500, the present inventors recognized that the skin effect can be mitigated by utilizing radiofrequency pulses at locations where only non-superconducting cables are available and by subsequently converting such radiofrequency pulses to baseband pulses at locations at which superconducting cables are available. After such realization, the present inventors performed simulations and/or experiments to verify such realization.

FIGS. 6-9 illustrate example, non-limiting simulation results that demonstrate how radiofrequency-to-baseband conversion can mitigate skin effect dispersion in accordance with one or more embodiments described herein. In other words, FIGS. 6-9 shows results that the present inventors obtained when simulating skin effect distortion on a radiofrequency waveform and when simulating skin effect distortion on a baseband waveform.

Figure 6:
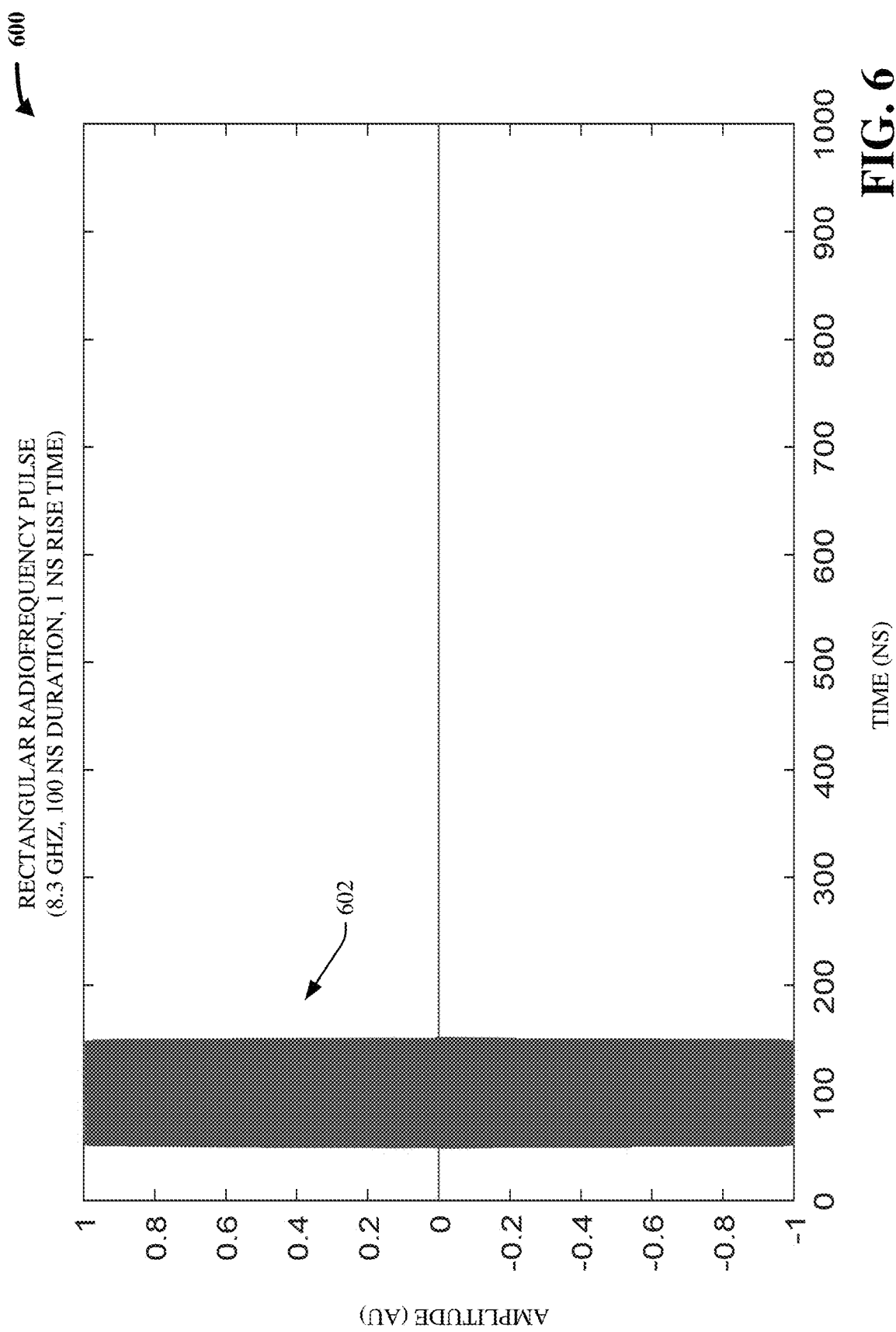
FIGS. 6-9 illustrate example, non-limiting simulation results that demonstrate how radiofrequency-to-baseband conversion can mitigate skin effect dispersion in accordance with one or more embodiments described herein.
Figure 7:
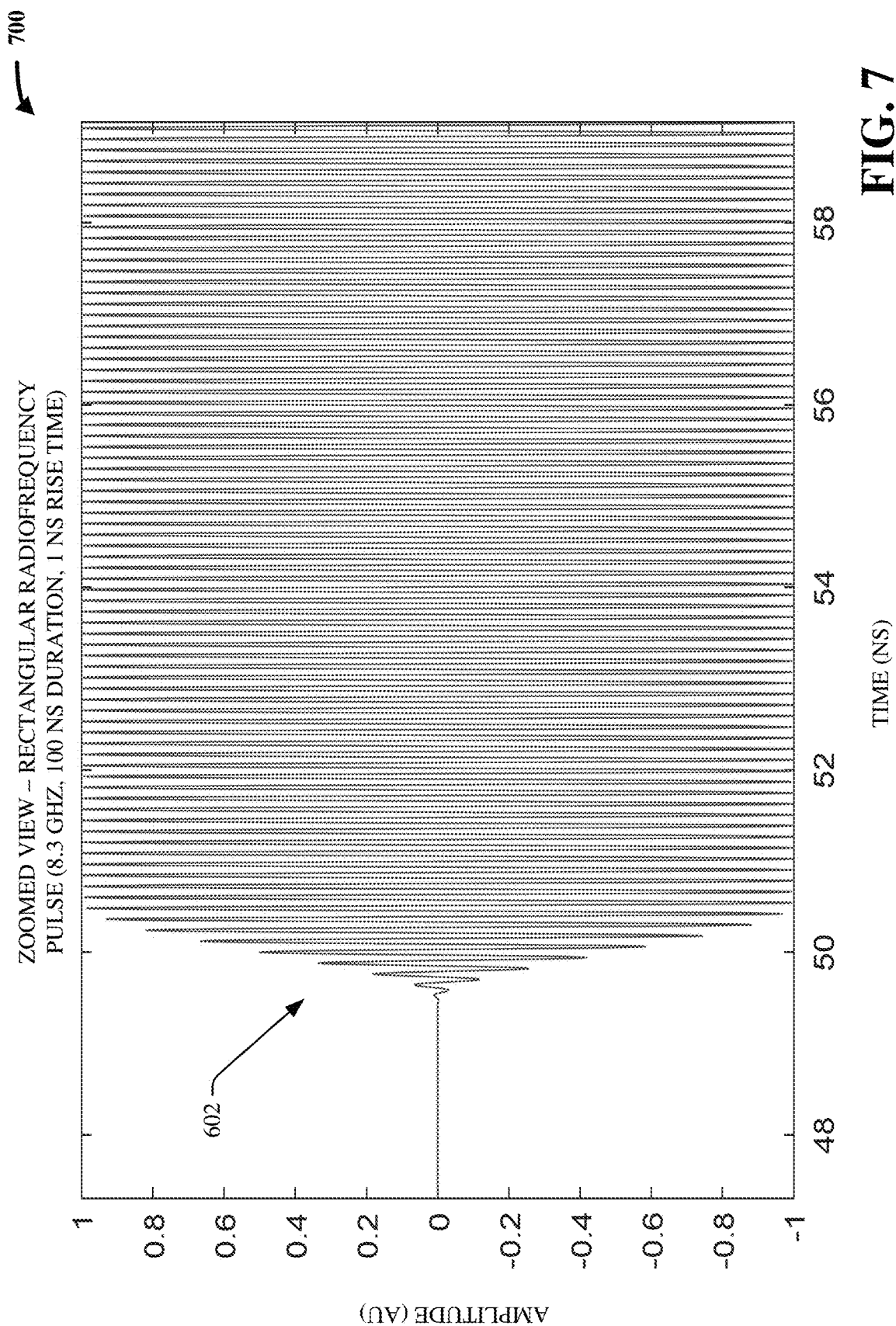

As shown, FIG. 6 depicts a graph 600 that shows a rectangular radiofrequency pulse 602. In this non-limiting example, the rectangular radiofrequency pulse 602 has a carrier frequency of 8.3 giga-Hertz, a duration of 100 nanoseconds, and a rise time of 1 nanosecond. As shown, FIG. 7 depicts a graph 700 that shows a zoomed-in view of the rectangular radiofrequency pulse 602. Specifically, FIG. 7 shows how the rectangular radiofrequency pulse 602 ramps up from a baseline amplitude of zero to its maximum amplitude of 1 within 1 nanosecond (e.g., from about the 49.5 nanosecond mark to about the 50.5 nanosecond mark).

Figure 8:
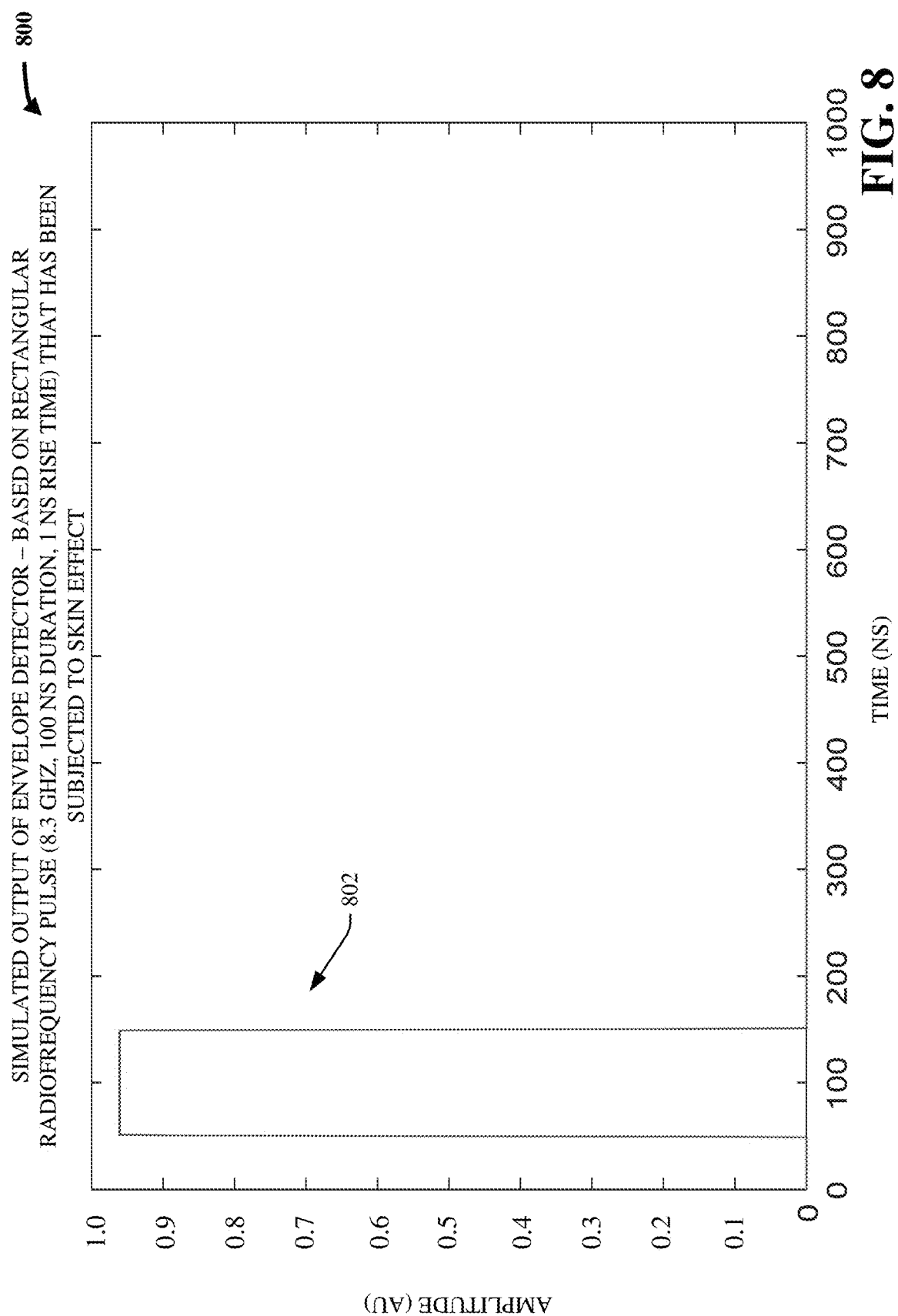
Figure 9:
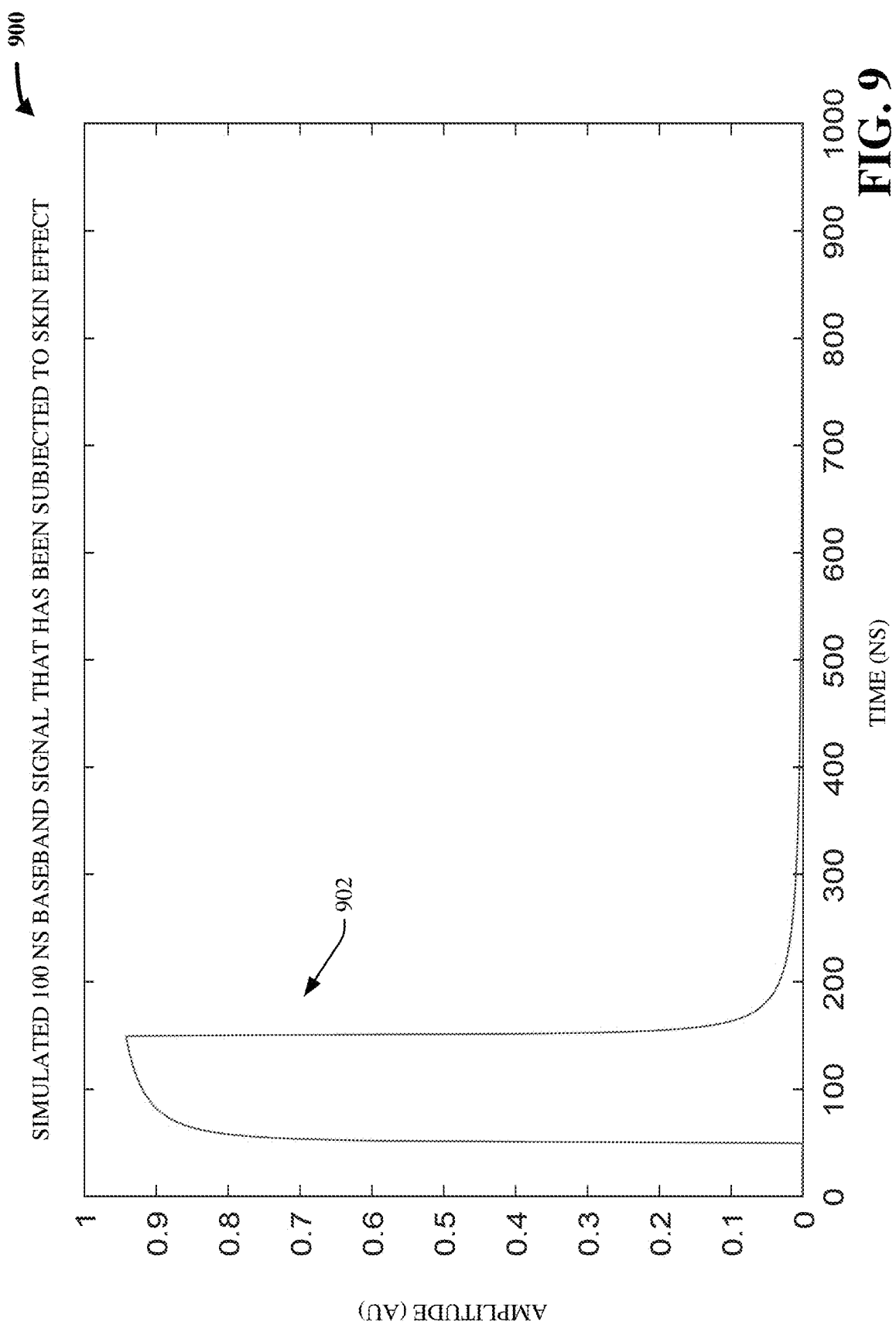

In various aspects, FIG. 8 shows a rectangular baseband pulse 802 that the present inventors obtained via simulation based on the rectangular radiofrequency pulse 602. More specifically, the present inventors computed the Fast Fourier Transform of the rectangular radiofrequency pulse 602, thereby bringing the rectangular radiofrequency pulse 602 from the time-domain into the frequency-domain. Next, the present inventors computed the skin effect distortion across the frequency spectrum for the rectangular radiofrequency pulse 602 using the above-described formula $H(\omega)=e^{-\sqrt{i\omega\tau}}$, where $\tau=1$ nanosecond. Then, the present inventors multiplied the Fast Fourier Transform of the rectangular radiofrequency pulse 602 by the computed skin effect distortion, thereby yielding a distorted radiofrequency pulse in the frequency-domain (e.g., simulating the distortion that the rectangular radiofrequency pulse 602 would experience when propagating through a non-superconducting cable). Next, the present inventors applied the Inverse Fast Fourier Transform to the distorted radiofrequency pulse, thereby changing the distorted radiofrequency pulse from the frequency-domain to the time-domain. Finally, the present inventors simulated the operation of an envelope detector by applying a low pass filter function to the time-domain representation of the distorted radiofrequency pulse, thereby capturing the envelope of the time-domain representation of the distorted radiofrequency pulse. The resulting envelope (e.g., the result of such simulation) was the rectangular baseband pulse 802. As shown, the rectangular baseband pulse 802 does not exhibit a slow ramp up and/or a long settling time, despite the fact that the rectangular radiofrequency pulse 602 was subjected to skin effect. Instead, the rectangular baseband pulse 802 exhibits the desired rectangular shape with a nearly-full amplitude and a duration of about 100 nanoseconds (e.g., crisp ramp up at about the 50 nanosecond mark, crisp ramp down at about the 150 nanosecond mark). In other words, these simulation results suggest that transmitting a radiofrequency pulse (e.g., 602) through a non-superconducting cable (e.g., where skin effect is applied) and subsequently capturing the envelope (e.g., 802) of that radiofrequency pulse is a methodology that can significantly mitigate and/or reduce skin effect distortion.

As a control, the present inventors performed a similar simulation procedure starting with a control rectangular baseband pulse that crisply ramped up, with a rise time of 1 nanosecond, from a baseline amplitude of zero to an amplitude of 1 at about the 50 nanosecond and that crisply ramped back down to the baseline amplitude of zero at about the 150 nanosecond mark. Note that such a control rectangular baseband pulse would be essentially visually indistinguishable from the rectangular baseband pulse 802; accordingly, a separate figure depicting this control rectangular baseband pulse is not shown in the figures. In various aspects, the present inventors computed the Fast Fourier Transform of the control rectangular baseband pulse, thereby bringing the control rectangular baseband pulse from the time-domain into the frequency-domain. Next, the present inventors computed the skin effect distortion across the frequency spectrum for the control rectangular baseband pulse using the above-described formula $H(\omega)=e^{-\sqrt{i\omega\tau}}$, where $\tau=1$ nanosecond. Then, the present inventors multiplied the Fast Fourier Transform of the control rectangular baseband pulse by the computed skin effect distortion, thereby yielding a distorted baseband pulse in the frequency-domain (e.g., simulating the distortion that the control rectangular baseband pulse would experience when propagating through a non-superconducting cable). Next, the present inventors applied the Inverse Fast Fourier Transform to the distorted baseband pulse, thereby brining the distorted baseband pulse from the frequency-domain back into the time-domain. Note that the present inventors did not apply a low-pass filter function to the time-domain representation of the distorted baseband pulse (e.g., which would otherwise simulate the operation of an envelope detector), since baseband pulses do not have envelopes. The result of such simulation was the distorted baseband pulse 902. As shown, the distorted baseband pulse 902 exhibits a slow and/or asymptotic ramp up (e.g., the rectangular baseband pulse 802 reaches 0.9 amplitude almost immediately after the 50 nanosecond mark, whereas the distorted baseband pulse 902 reaches 0.9 amplitude at about the 100 nanosecond mark). As also shown, the distorted baseband pulse 902 exhibits a very long settling time (e.g., the rectangular baseband pulse 802 settles almost immediately after the 150 nanosecond mark, whereas the distorted baseband pulse 902 does not settle until well after the 400 nanosecond mark). In other words, these simulation results suggest that transmitting a baseband pulse (e.g., the control rectangular baseband pulse that would look identical to 802) through a non-superconducting cable (e.g., where skin effect is applied) would cause the baseband pulse to be significantly distorted. As explained with respect to FIGS. 6-8, such distortion can be avoided by transmitting radiofrequency pulses at locations where only non-superconducting cables are available and subsequently converting such radiofrequency pulses to baseband pulses (e.g., by taking the envelopes of the radiofrequency pulses) at locations where superconducting cables are available.

Figure 10:
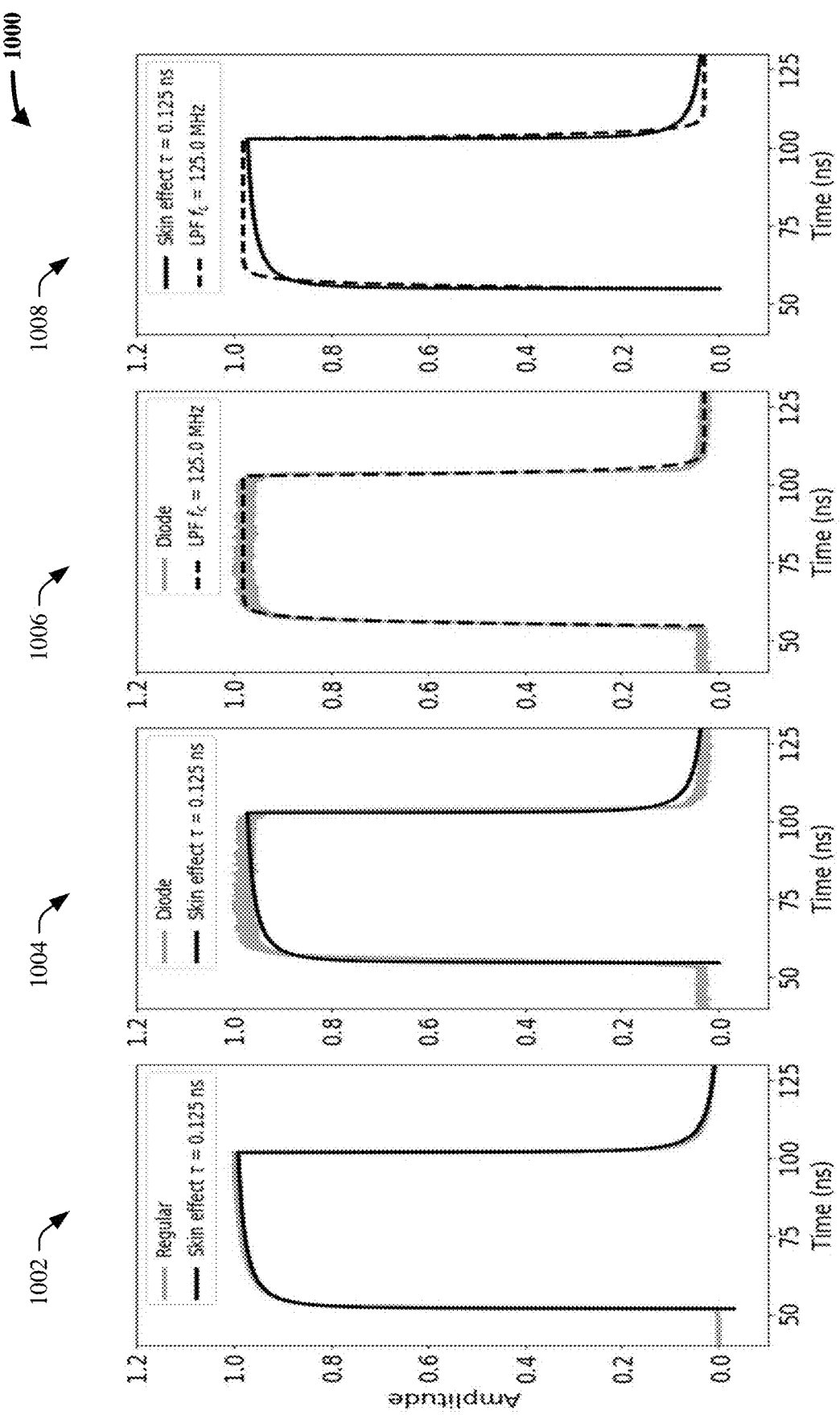
FIG. 10 illustrates example, non-limiting experimental results that demonstrate that radiofrequency-to-baseband conversion can mitigate skin effect dispersion in accordance with one or more embodiments described herein.

FIG. 10 illustrates example, non-limiting experimental results 1000 that demonstrate that radiofrequency-to-baseband conversion can mitigate skin effect dispersion in accordance with one or more embodiments described herein. In other words, the present inventors supplemented the above simulations discussed with respect to FIGS. 6-9 with additional experimental verification.

As shown, FIG. 10 includes a graph 1002, a graph 1004, a graph 1006, and a graph 1008. In various aspects, the graph 1002 illustrates an orange plot and a black curve. In the graph 1002, the orange plot represents the amplitude (e.g., voltage) of a baseband pulse that has been obtained by transmitting an initially-rectangular baseband pulse having a duration of about 50 nanoseconds and a rise time of about 0.125 nanoseconds through a non-superconducting wire (e.g., such that the initially-rectangular baseband pulse was exposed to skin effect). In the graph 1002, the black curve represents a skin-effect distortion curve that has been fitted to the orange curve. Those having ordinary skill in the art will appreciate that the black curve in the graph 1002 can be obtained by using the formula $H(\omega) = e^{-\sqrt{i\omega\tau}}$ and the above-described Fast Fourier Transform simulation procedure.

In various instances, the graph 1004 illustrates an orange plot and a black curve. In the graph 1004, the orange plot represents the amplitude (e.g., voltage) of a baseband pulse that has been obtained by transmitting an initially-rectangular radiofrequency pulse having a duration of about 50 nanoseconds and a rise time of about 0.125 nanoseconds through a non-superconducting wire (e.g., such that the initially-rectangular radiofrequency pulse was exposed to skin effect) and subsequently converting the initially-rectangular radiofrequency pulse into a baseband pulse by capturing its envelope via a diode detector. In the graph 1004, the black curve is the same black curve as in the graph 1002. As shown in the graph 1004, the black curve has a distorted ramp-up (e.g., rounded and/or shallow top left corner) and a long settling time (e.g., rounded and/or heightened bottom right corner). In contrast, the orange curve in the graph 1004 does not have nearly as distorted of a ramp-up (e.g., crisper and higher top left corner) and does not have a long settling time (e.g., crisper and deeper bottom right corner).

In various cases, the graph 1006 illustrates an orange plot and a dotted black curve. In the graph 1006, the orange plot is the same as the orange plot in the graph 1004. In the graph 1006, the dotted black curve is a low-pass filter function (e.g., with an impedance value of 125 Ohms, a capacitance value of 10 pico-Farads, and a filter frequency value of 125 mega-Hertz) that has been fitted to the orange curve. The graph 1006 shows that the output of an envelope detector (e.g., a diode detector) can be accurately modeled by a low-pass filter function, as mentioned above with respect to the simulation procedure of FIGS. 6-9.

Lastly, in various aspects, the graph 1008 illustrates a black curve and a dotted black curve. In the graph 1008, the black curve is the same black curve as in the graph 1002 and the graph 1004. In the graph 1008, the dotted black curve is the same dotted black curve as in the graph 1006. Accordingly, the graph 1008 clearly shows the difference between the black curve (e.g., the resulting baseband pulse that is obtained by transmitting a rectangular baseband pulse through a non-superconducting wire) and the dotted black curve (e.g., the resulting baseband pulse that is obtained by transmitting a rectangular radiofrequency pulse through a non-superconducting wire and subsequently capturing the envelope of the radiofrequency pulse via a diode detector). As shown, the latter exhibits significantly less ramp-up distortion and significantly less settling time. Such experimental results help to validate the technical benefits of various embodiments described herein. In other words, when radiofrequency-to-baseband conversion is implemented as described herein, skin effect distortion can be significantly reduced.

In various instances, the present inventors further conducted various experiments, which verified that envelope detectors (e.g., such as diode detectors and Josephson junction detectors) still retain their functionality and/or operability at cryogenic temperatures.

Various embodiments of the invention have so far been described mainly with reference to rectangular pulses that have a baseline amplitude of zero. In various cases, however, various embodiments of the invention can be implemented with rectangular offset pulses that have any suitable non-zero baseline amplitude. This is further explained with respect to FIGS. 11-14.

Figure 11:
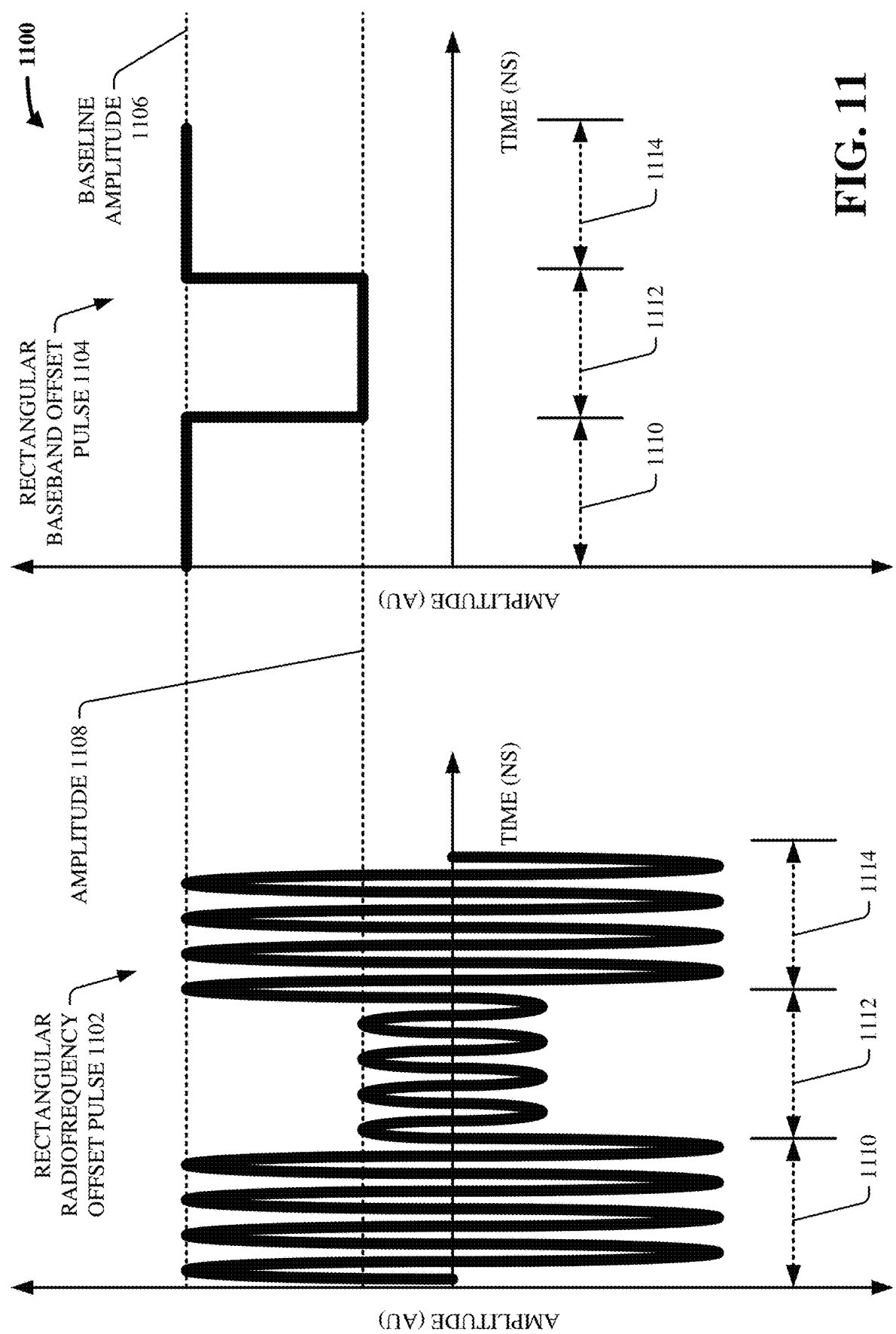
FIGS. 11-12 illustrate example, non-limiting graphs of a rectangular radiofrequency offset pulse and a corresponding rectangular baseband offset pulse in accordance with one or more embodiments described herein.
Figure 12:
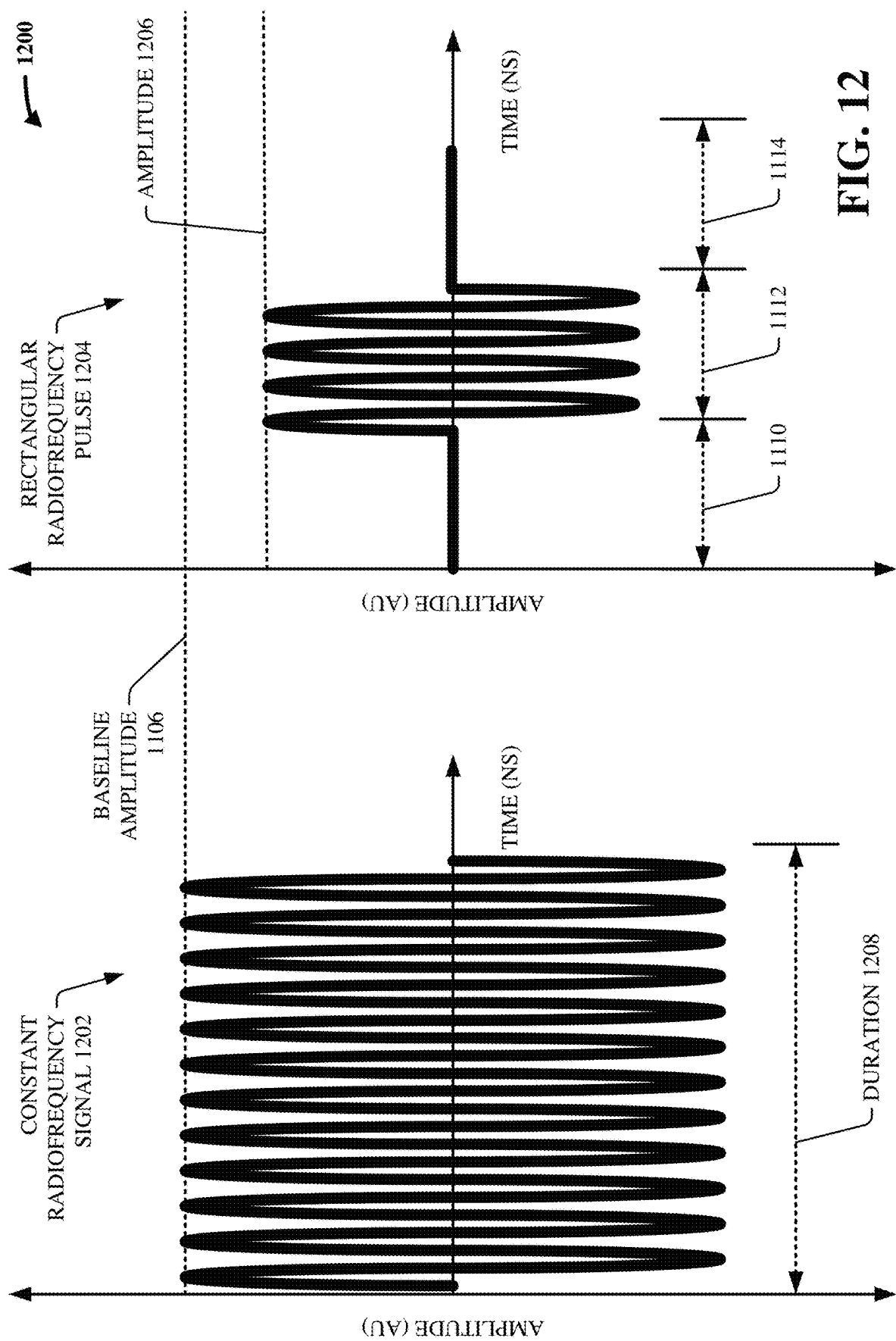

FIGS. 11-12 illustrate example, non-limiting graphs 1100 and 1200 of a rectangular radiofrequency offset pulse and a corresponding baseband offset pulse in accordance with one or more embodiments described herein. That is, FIGS. 11-12 depict non-limiting example embodiments of the radiofrequency output 112 and the baseband output 114, to help further clarify how the envelope detector 106 can function.

In various embodiments, the radiofrequency output 112 can be a rectangular radiofrequency offset pulse 1102. As shown, the rectangular radiofrequency offset pulse 1102 can be an oscillatory waveform having a baseline amplitude 1106 and an amplitude 1108, where the baseline amplitude 1106 and the amplitude 1108 can have any suitable magnitudes. As shown, the rectangular radiofrequency offset pulse 1102 can be at the baseline amplitude 1106 for a duration 1110. After the duration 1110, the rectangular radiofrequency offset pulse 1102 can switch to the amplitude 1108 for a duration 1112. After the duration 1112, the rectangular radiofrequency offset pulse 1102 can switch back to the baseline amplitude 1106. Although FIG. 11 shows the durations 1110-1114 as all be equal in length, this is a mere non-limiting example. In various cases, the durations 1110-1114 can be the same and/or different lengths as each other. Although not explicitly shown in FIG. 11, those having ordinary skill in the art will appreciate that the rectangular radiofrequency offset pulse 1102 can have any suitable rise time (e.g., time to ramp up/down from the baseline amplitude 1106 to the amplitude 1108), such as one nanosecond.

In various embodiments, when the radiofrequency output 112 is the rectangular radiofrequency offset pulse 1102, the baseband output 114 can be the rectangular baseband offset pulse 1104. In other words, when the envelope detector 106 receives as input the rectangular radiofrequency offset pulse 1102, the envelope detector 106 can produce as a response the rectangular baseband offset pulse 1104. As shown, the rectangular baseband offset pulse 1104 can be a non-oscillatory waveform the shape of which matches and/or is equivalent to the envelope (e.g., upper envelope, in this non-limiting example) of the rectangular radiofrequency offset pulse 1102. More specifically, the rectangular baseband offset pulse 1104 can have the same (e.g., within any suitable threshold margin) amplitudes and/or durations as the rectangular radiofrequency offset pulse 1102. For instance, the rectangular baseband offset pulse 1104 can be at the baseline amplitude 1106 for the duration 1110; after the duration 1110, the rectangular baseband offset pulse 1104 can switch to the amplitude 1108 for the duration 1112; and after the duration 1112, the rectangular baseband offset pulse 1104 can switch back to the baseline amplitude 1106 for the duration 1114. Although not explicitly shown in FIG. 11, the rectangular baseband offset pulse 1104 can also have the same (e.g., within any suitable threshold margin) rise time as the rectangular radiofrequency offset pulse 1102. However, the rectangular baseband offset pulse 1104 can, as shown, not exhibit the same oscillatory frequency or the same oscillatory phase as the rectangular radiofrequency offset pulse 1102.

Again, this helps to demonstrate that the characteristics (e.g., amplitude, duration, rise time) of the baseband output 114 can be controllably adjusted by controlling the characteristics of the radiofrequency output 112.

FIG. 12 shows a non-limiting example of how the rectangular radiofrequency offset pulse 1102 can be generated. Specifically, in various cases, the rectangular radiofrequency offset pulse 1102 can be the result obtained by superimposing a rectangular radiofrequency pulse 1204 onto a constant radiofrequency signal 1202. As shown, in various aspects, the constant radiofrequency signal 1202 can be an oscillatory waveform that has the baseline amplitude 1106 and that can last for a duration 1208, where the duration 1208 can be equal to the sum of the durations 1110, 1112, and 1114. Furthermore, in various instances, the rectangular radiofrequency pulse 1204 can be an oscillatory waveform that has an amplitude 1206 for the duration 1112 and that has zero amplitude for the duration 1110 and for the duration 1114. In this non-limiting example, the amplitude 1206 can be equal to the difference between the baseline amplitude 1106 and the amplitude 1108. Although not explicitly shown in FIG. 12, the rectangular radiofrequency pulse 1204 can further be 180 degrees out of phase with the constant radiofrequency signal 1202. Accordingly, when the rectangular radiofrequency pulse 1204 is superimposed onto the constant radiofrequency signal 1202, destructive interference can occur during the duration 1112, and the result can be the rectangular radiofrequency offset pulse 1102.

Although FIGS. 11-12 show the amplitude 1108 as being less than the baseline amplitude 1106 and show the amplitude 1206 being equal to the difference between the baseline amplitude 1106 and the amplitude 1108, this is a mere non-limiting example. In various cases, the amplitude 1108 can be greater than the baseline amplitude 1106. Such case can be achieved when the rectangular radiofrequency pulse 1204 is in phase (and/or not 180 degrees out of phase) with the constant radiofrequency signal 1202 (e.g., constructive interference can occur when superimposed waveforms are in phase).

Figure 13:
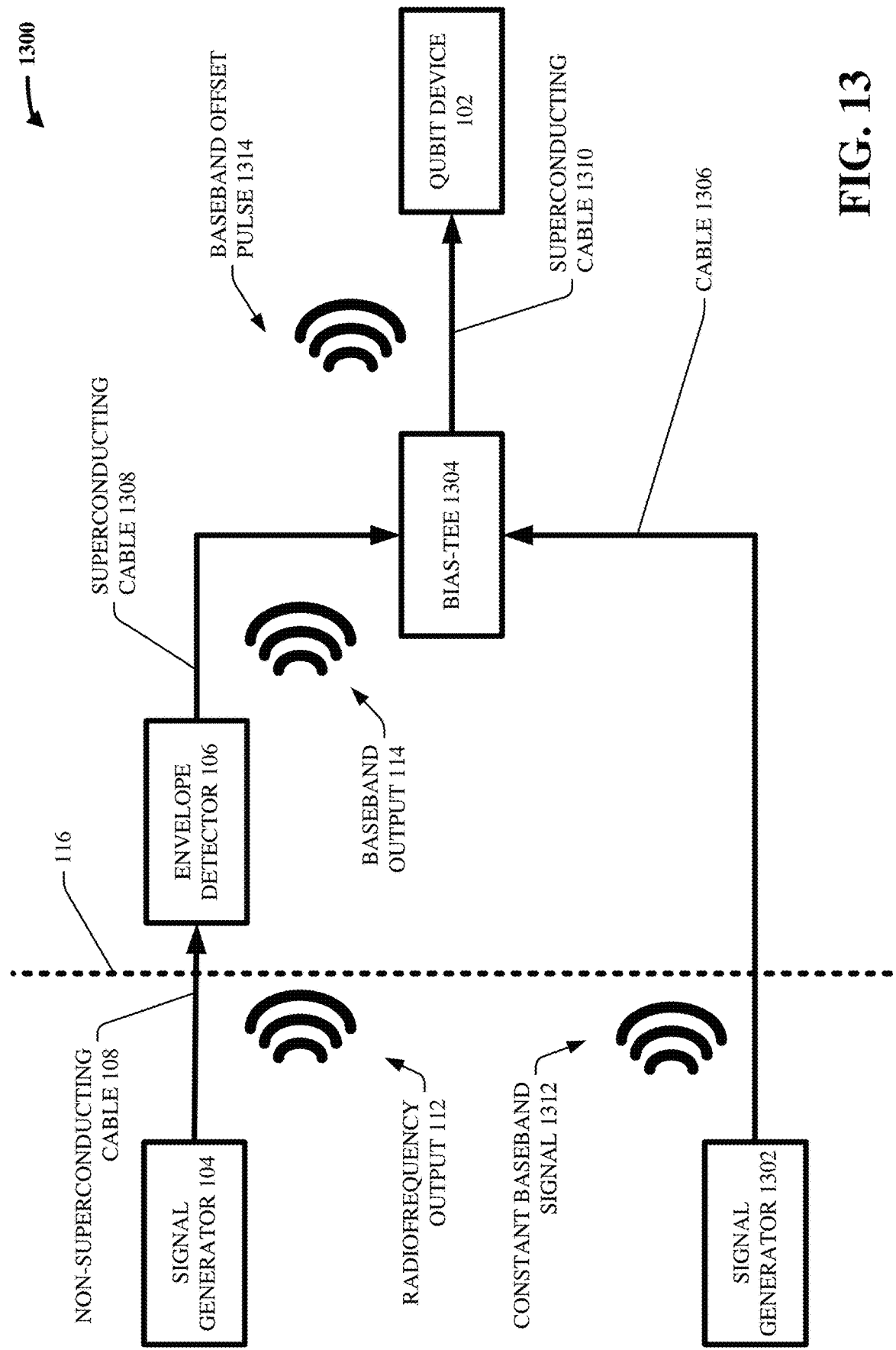
FIG. 13 illustrates an example, non-limiting block diagram of a system including a constant baseband signal and a bias-tee that facilitates mitigation of baseband pulse distortion via radiofrequency-to-baseband conversion in accordance with one or more embodiments described herein.
Figure 14:
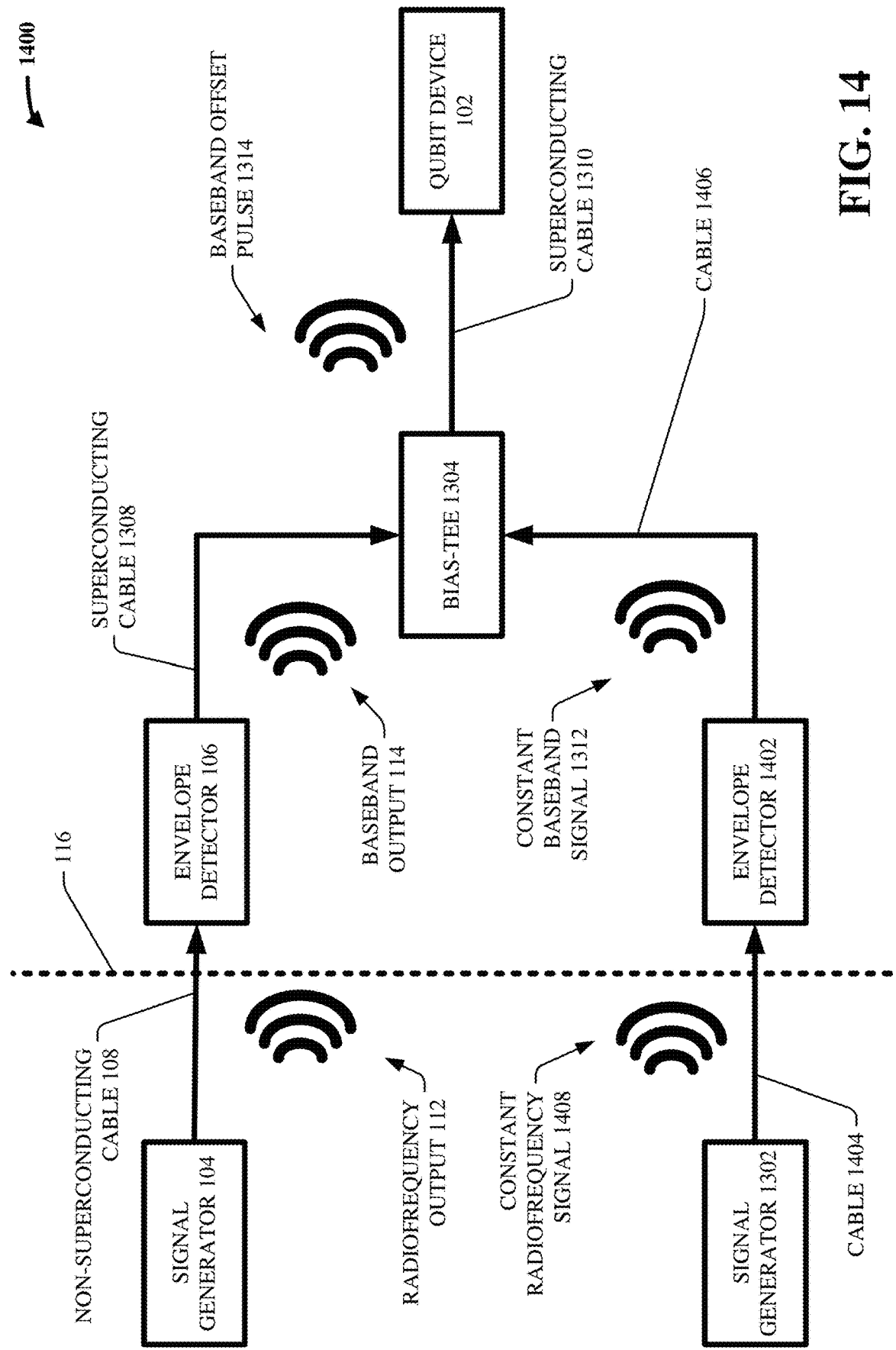
FIG. 14 illustrates an example, non-limiting block diagram of a system including a constant radiofrequency signal, a second envelope detector, and a bias-tee that facilitates mitigation of baseband pulse distortion via radiofrequency-to-baseband conversion in accordance with one or more embodiments described herein.

FIGS. 13-14 show additional embodiments in which offset pulses can be generated.

FIG. 13 illustrates an example, non-limiting block diagram of a system 1300 including a constant baseband signal and a bias-tee that can facilitate mitigation of baseband pulse distortion via radiofrequency-to-baseband conversion in accordance with one or more embodiments described herein. As shown, the system 1300 can, in some cases, comprise the signal generator 104, the non-superconducting cable 108, the envelope detector 106, and the qubit device 102, as described above. In various instances, the system 1300 can further comprise a signal generator 1302 and a bias-tee 1304.

In various embodiments, the signal generator 104 can be coupled to the envelope detector 106 via the non-superconducting cable 108, as described above. In various aspects, as shown, the envelope detector 106 can be coupled to the bias-tee 1304 via a superconducting cable 1308 (e.g., any suitable superconducting wire). Although not explicitly shown in FIG. 13, the bias-tee 1304 can, in some embodiments, be replaced with a resistive-tee and/or with any other suitable circuit structure that can combine and/or superimpose two waveforms together. In various aspects, the bias-tee 1304 can be implemented at any suitable cryogenic temperature. In various instances, as shown, the signal generator 1302 can be coupled to the bias-tee 1304 via a cable 1306. In various cases, the cable 1306 can be either superconducting or non-superconducting, as desired. Lastly, as shown, the bias-tee 1304 can be coupled to the qubit device 102 via a superconducting cable 1310 (e.g., any suitable superconducting wire).

In various aspects, as explained above, the signal generator 104 can electronically produce the radiofrequency output 112, which can be carried to the envelope detector 106 by the non-superconducting cable 108. The radiofrequency output 112 can be substantially undistorted by cable dispersion (e.g., skin effect) during transmission through the non-superconducting cable 108, as explained at length above. In response to the radiofrequency output 112, the envelope detector 106 can produce the baseband output 114, which can be equivalent to the envelope of the radiofrequency output 112. In various cases, the superconducting cable 1308 can carry the baseband output 114 to the bias-tee 1304. Note that the baseband output 114 can be undistorted by cable dispersion since the baseband output 114 can be transmitted through the superconducting cable 1308 (e.g., as opposed to a non-superconducting cable).

In various aspects, the signal generator 1302 can electronically produce a constant baseband signal 1312. In various instances, the constant baseband signal 1312 can be a non-oscillatory waveform that has any suitable constant amplitude for its duration. In some cases, the constant baseband signal 1312 can be considered as one rectangular baseband pulse that has a very long duration compared to any suitable threshold (e.g., very long duration compared to the duration of the baseband output 114). In various aspects, the cable 1306 can carry the constant baseband signal 1312 to the bias-tee 1304. Note that the constant baseband signal 1312 can experience dispersion-induced distortion when the cable 1306 is non-superconducting. However, because the constant baseband signal 1312 can be a constant signal (e.g., a single long signal that does not have multiple ramp-ups and/or ramp-downs), the slow ramp-up distortion and/or the long settling time distortion that are normally caused by cable dispersion (e.g., skin effect) can be immaterial.

In any case, the bias-tee 1304 can receive both the constant baseband signal 1312 and the baseband output 114, and the bias-tee 1304 can superimpose the baseband output 114 onto the constant baseband signal 1312, thereby resulting in a baseband offset pulse 1314. Although a graph of the baseband offset pulse 1314 is not explicitly shown in the figures, those having ordinary skill in the art will appreciate that the baseband offset pulse can be considered as the result of constructive interference (and/or destructive interference) between the baseband output 114 and the constant baseband signal 1312. Accordingly, this can cause the baseband offset pulse 1314 to have as its baseline amplitude the amplitude of the constant baseband signal 1312.

In various aspects, the superconducting cable 1310 can carry the baseband offset pulse 1314 to the qubit device 102, so as to cause flux-tuning of the qubit device 102. Note that the baseband offset pulse 1314 can be undistorted by cable dispersion since the baseband offset pulse 1314 can be transmitted through the superconducting cable 1310 (e.g., as opposed to a non-superconducting cable).

As mentioned above, the numeral 116 can indicate a boundary between non-cryogenic (e.g., left of the numeral 116) and cryogenic (e.g., right of the numeral 116) temperatures. In other words, the numeral 116 can indicate which components can exist and/or be implemented outside of a cryostat (e.g., left of the numeral 116) and which other components can exist and/or be implemented inside of a cryostat (e.g., right of the numeral 116). In particular, and as mentioned above, the signal generator 104 and/or some portion of the non-superconducting cable 108 can exist and/or be implemented outside of the cryostat (e.g., where superconductivity cannot practicably be achieved). In contrast, a remaining portion of the non-superconducting cable 108, the envelope detector 106, and/or the qubit device 102 can exist and/or be implemented inside of the cryostat (e.g., where superconductivity can practicably be achieved). In various embodiments, as shown in FIG. 13, the signal generator 1302 and/or some portion of the cable 1306 can be implemented outside of the cryostat, whereas a remainder of the cable 1306, the bias-tee 1304, the superconducting cable 1308, and/or the superconducting cable 1310 can be implemented inside of the cryostat. Again, as mentioned above, those having ordinary skill in the art will appreciate that any suitable number of temperature stages can be implemented as desired.

FIG. 14 illustrates an example, non-limiting block diagram of a system 1400 including a constant radiofrequency signal, a second envelope detector, and a bias-tee that can facilitate mitigation of baseband pulse distortion via radiofrequency-to-baseband conversion in accordance with one or more embodiments described herein. As shown, the system 1400 can, in some cases, comprise the signal generator 104, the non-superconducting cable 108, the envelope detector 106, the superconducting cable 1308, the signal generator 1302, the bias-tee 1304, the superconducting cable 1310, and the qubit device 102, as described above. In various instances, the system 1400 can further comprise an envelope detector 1402.

In various embodiments, as shown, the signal generator 1302 can be coupled to the envelope detector 1402 (e.g., a diode detector, a precision detector, a mixer, a Josephson junction detector) via a cable 1404. In various aspects, the envelope detector 1402 can be implemented at any suitable cryogenic temperature. Furthermore, in various instances, the cable 1404 can be either superconducting or non-superconducting, as desired. In various cases, the envelope detector 1402 can be coupled to the bias-tee 1304 via a cable 1406 which can be either superconducting or non-superconducting, as desired.

In various aspects, the signal generator 1302 can electronically produce a constant radiofrequency signal 1408. In various instances, the constant radiofrequency signal 1408 can be an oscillatory waveform that has any suitable constant amplitude for its duration. In some cases, the constant radiofrequency signal 1408 can be considered as one rectangular radiofrequency pulse that has a very long duration compared to any suitable threshold (e.g., very long duration compared to the duration of the baseband output 114). In various aspects, the cable 1404 can carry the constant radiofrequency signal 1408 to the envelope detector 1402. In response to the constant radiofrequency signal 1408, the envelope detector 1402 can produce the constant baseband signal 1312. In the non-limiting example shown in FIG. 14, the constant baseband signal 1312 can be equivalent to the envelope (e.g., upper envelope) of the constant radiofrequency signal 1408. Accordingly, the bias-tee 1304 can combine the baseband output 114 with the constant baseband signal 1312 to yield the baseband offset pulse 1314, as described above.

In various cases, the envelope detector 106 and the envelope detector 1402 can both be diode detectors. In such cases, if such diode detectors are of the same polarity, the baseband offset pulse 1314 can be considered as the result obtained from constructive interference between the baseband output 114 and the constant baseband signal 1312. On the other hand, if such diode detectors are of opposite polarities, the baseband offset pulse 1314 can be considered as the result obtained from destructive interference between the baseband output 114 and the constant baseband signal 1312.

As mentioned above, the numeral 116 can indicate a boundary between non-cryogenic (e.g., left of the numeral 116) and cryogenic (e.g., right of the numeral 116) temperatures. In particular, and as mentioned above, the signal generator 104 and/or some portion of the non-superconducting cable 108 can exist and/or be implemented outside of the cryostat, whereas a remaining portion of the non-superconducting cable 108, the envelope detector 106, the superconducting cable 1308, the bias-tee 1304, the superconducting cable 1310, and/or the qubit device 102 can exist and/or be implemented inside of the cryostat. In various embodiments, as shown in FIG. 14, the signal generator 1302 and/or some portion of the cable 1404 can be implemented outside of the cryostat, whereas a remainder of the cable 1404, the envelope detector 1402, and/or the cable 1406 can be implemented inside of the cryostat. However, this is a non-limiting example. In some cases, the signal generator 1302, the cable 1404, the envelope detector 1402, and/or some portion of the cable 1406 can be implemented outside of the cryostat, whereas a remainder of the cable 1406 can be implemented inside of the cryostat. Again, as mentioned above, those having ordinary skill in the art will appreciate that any suitable number of temperature stages can be implemented as desired.

As explained herein, various embodiments of the invention can address the technical problem of dispersion-induced distortion. However, various embodiments of the invention can provide further benefits. For example, in some cases, various embodiments described herein can reduce a total amount and/or length of drive lines (e.g., cables, wires) needed to perform flux-tuning of multiple qubit devices. This is further explained with respect to FIG. 15.

Figure 15:
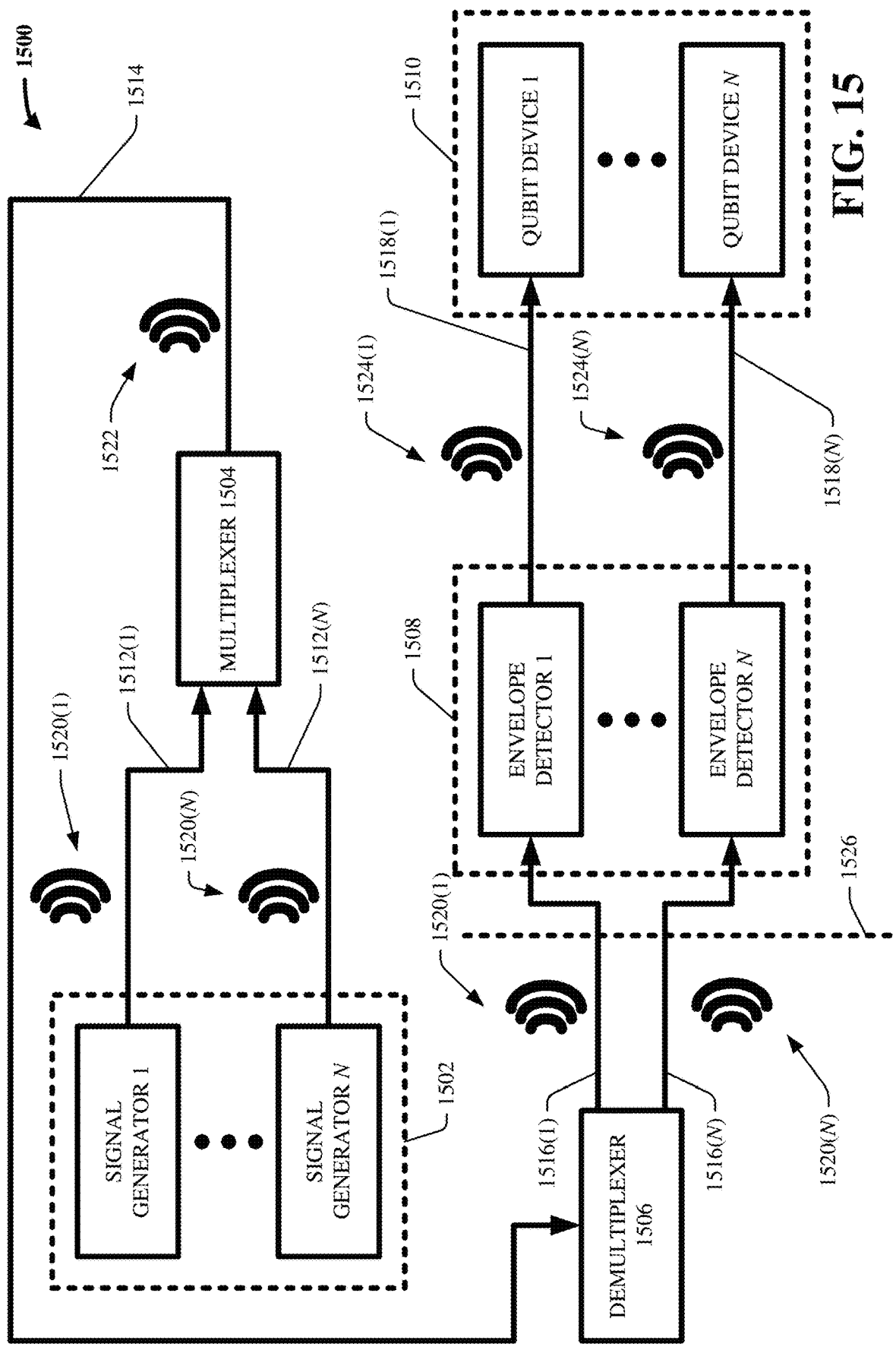
FIG. 15 illustrates an example, non-limiting block diagram of a system including a multiplexer and a demultiplexer that facilitates mitigation of baseband pulse distortion via radiofrequency-to-baseband conversion in accordance with one or more embodiments described herein.

FIG. 15 illustrates an example, non-limiting block diagram of a system 1500 including a multiplexer and a demultiplexer that can facilitate mitigation of baseband pulse distortion via radiofrequency-to-baseband conversion in accordance with one or more embodiments described herein.

In various embodiments, as shown, there can be a set of signal generators 1502. In various aspects, the set of signal generators 1502 can include n signal generators for any suitable positive integer n: a signal generator 1 to a signal generator n. In various instances, each of the set of signal generators 1502 can be coupled to a multiplexer 1504 by a respectively corresponding non-superconducting cable. For instance, the signal generator 1 can be coupled to the multiplexer 1504 by a non-superconducting cable 1512(1), and the signal generator n can be coupled to the multiplexer 1504 by a non-superconducting cable 1512(n). In any case, the multiplexer 1504 can be any suitable circuit structure that can perform frequency-division multiplexing on two or more inputted radiofrequency waveforms. In various aspects, the multiplexer 1504 can be coupled to a demultiplexer 1506 via a non-superconducting cable 1514. In various instances, the demultiplexer 1506 can be any suitable circuit structure that is capable of performing frequency-division demultiplexing on an inputted multiplexed radiofrequency waveform. Those having ordinary skill in the art will appreciate that the multiplexer 1504 and/or the demultiplexer 1506 can be implemented at any suitable temperatures (e.g., room temperature outside of a cryostat, cryogenic temperature inside of a cryostat). Furthermore, those having ordinary skill in the art will further appreciate that the multiplexer 1504 and the demultiplexer 1506 can be implemented at the same and/or different temperatures as each other. For example, the multiplexer 1504 can be implemented at room temperature and/or otherwise at a non-cryogenic temperature (e.g., outside of a cryostat), and the demultiplexer 1506 can be implemented at a cryogenic temperature (e.g., inside of a cryostat).

In various cases, as shown, there can be a set of envelope detectors 1508 that respectively correspond to the set of signal generators 1502. Thus, the set of envelope detectors 1508 can include n envelope detectors: an envelope detector 1 to an envelope detector n. In various aspects, each of the set of envelope detectors 1508 can be coupled to the demultiplexer 1506 via a respectively corresponding non-superconducting cable. For example, the envelope detector 1 can be coupled to the demultiplexer 1506 via a non-superconducting cable 1516(1), and the envelope detector n can be coupled to the demultiplexer 1506 via a non-superconducting cable 1516(n).

In various instances, there can be a set of qubit devices 1510 that respectively correspond to the set of signal generators 1502 and/or to the set of envelope detectors 1508. So, the set of qubit devices 1510 can include n qubit devices: a qubit device 1 to a qubit device n. In various aspects, each of the set of envelope detectors 1508 can be coupled to a respectively corresponding one of the set of qubit devices 1510 by a respectively corresponding superconducting cable. For instance, the envelope detector 1 can be coupled to the qubit device 1 via a superconducting cable 1518(1), and the envelope detector n can be coupled to the qubit device n via a superconducting cable 1518(n).

In various embodiments, each of the set of signal generators 1502 can electronically produce a respectively corresponding radiofrequency output that can be routed to the multiplexer 1504. For example, the signal generator 1 can produce a radiofrequency output 1520(1) that can be carried to the multiplexer 1504 via the non-superconducting cable 1512(1). Likewise, the signal generator n can produce a radiofrequency output 1520(n) that can be carried to the multiplexer 1504 via the non-superconducting cable 1512(n). In various instances, each of such radiofrequency outputs can have its own unique and/or distinct frequency (e.g., the frequency of the radiofrequency output 1520(1) can be different from that of the radiofrequency output 1520(n)). In various cases, each of such n radiofrequency outputs can experience negligible dispersion-induced distortion.

In various aspects, the multiplexer 1504 can multiplex together all of the radiofrequency outputs produced by the set of signal generators 1502, thereby yielding a multiplexed radiofrequency output 1522. In other words, the multiplexer 1504 can combine and/or superimpose all of the radiofrequency output 1520(1) to the radiofrequency output 1520(n) together, and the result of such multiplexing can be the multiplexed radiofrequency output 1522. In various instances, the non-superconducting cable 1514 can carry the multiplexed radiofrequency output 1522 to the demultiplexer 1506. In various cases, the multiplexed radiofrequency output 1522 can experience negligible dispersion-induced distortion.

In various cases, the demultiplexer 1506 can demultiplex the multiplexed radiofrequency output 1522 back into the n separate and/or distinct radiofrequency outputs. That is, the demultiplexer 1506 can divide the multiplexed radiofrequency output 1522, so that all of the radiofrequency output 1 to the radiofrequency output n are once again separated.

In various aspects, each of the n radiofrequency outputs can then be routed to a respectively corresponding one of the set of envelope detectors 1508. For example, the radiofrequency output 1520(1) can be carried to the envelope detector 1 by the non-superconducting cable 1516(1). Similarly, the radiofrequency output 1520(n) can be carried to the envelope detector n by the non-superconducting cable 1516(n). In various cases, each of such n radiofrequency outputs can experience negligible dispersion-induced distortion.

In various instances, each of the set of envelope detectors 1508 can generate a baseband output by extracting the envelope of a respectively corresponding one of the n radiofrequency outputs, thereby yielding n baseband outputs. For instance, the envelope detector 1 can take the envelope of the radiofrequency output 1520(1), and such envelope can be considered as a baseband output 1524(1). Likewise, the envelope detector n can take the envelope of the radiofrequency output 1520(n), and such envelope can be considered as a baseband output 1524(n).

Finally, in various aspects, each of the set of qubit devices 1510 can be exposed to a respectively corresponding one of the n baseband outputs. For example, the baseband output 1524(1) can be carried to the qubit device 1 by the superconducting cable 1518(1), thereby facilitating flux-tuning of the qubit device 1. Similarly, the baseband output 1524(n) can be carried to the qubit device n by the superconducting cable 1518(n), thereby facilitating flux-tuning of the qubit device n. In various cases, each of such n baseband outputs can experience negligible dispersion-induced distortion.

Note that, in various cases, even though there are n qubit devices in the set of qubit devices 1510, there do not need to be n long drive lines/cables/wires coupling the set of qubit devices 1510 to the set of signal generators 1502. Instead, there can be n short lines coupling the set of signal generators 1502 to the multiplexer 1504, there can be one long line coupling the multiplexer 1504 to the demultiplexer 1506, there can be n short lines coupling the demultiplexer 1506 to the set of envelope detectors 1508, and there can be n short lines coupling the set of envelope detectors 1508 to the set of qubit devices 1510. In other words, the system 1500 can include a smaller total amount and/or length of cable/wire as compared to existing systems/techniques for flux-tuning (e.g., the system 1500 can have 3n very short lines/cables and one very long line/cable, as compared to existing systems which can have n very long lines/cables). This is a further benefit and/or advantage of various embodiments of the invention.

In various cases, the numeral 1526 can indicate a boundary between non-cryogenic temperatures and/or cryogenic temperatures of the system 1500 (e.g., similar to the numeral 116). That is, the numeral 1526 can indicate a boundary of a cryostat (not shown) inside which and/or outside which various components of the system 1500 can be implemented. For example, non-cryogenic temperatures can exist to the left of the numeral 1526, and cryogenic temperatures can exist to the right of the numeral 1526. That is, in various aspects, the set of signal generators 1502, the non-superconducting cables 1512, the multiplexer 1504, the non-superconducting cable 1514, the demultiplexer 1506, and/or some portion of the non-superconducting cables 1516 can exist and/or be implemented outside of the cryostat, whereas the remainder of the non-superconducting cables 1516, the set of envelope detectors 1508, the superconducting cables 1518, and/or the set of qubit devices 1510 can exist and/or be implemented inside of the cryostat. However, this location of the numeral 1526 is a mere non-limiting example. In various other cases, the set of signal generators 1502, the non-superconducting cables 1512, the multiplexer 1504, and some portion of the non-superconducting cable 1514 can exist and/or be implemented outside of the cryostat, whereas the remainder of the non-superconducting cable 1514, the demultiplexer 1506, the non-superconducting cables 1516, the set of envelope detectors 1508, the superconducting cables 1518, and/or the set of qubit devices 1510 can exist and/or be implemented inside of the cryostat. As those having ordinary skill in the art will appreciate, any suitable number of temperature stages can be implemented to the left and/or right of the numeral 1526 (e.g., any suitable number of non-cryogenic temperature stages, any suitable number of cryogenic temperature stages).

Various embodiments of the invention have so far been described with respect to driving qubit devices (e.g., 102, 1510). However, this is a mere non-limiting example. Those having ordinary skill in the art will appreciate that the herein-described teachings can be applied to any suitable computing devices that are driven by baseband signals.

Furthermore, various embodiments described herein have so far been discussed mainly in relation to the skin effect. However, those having ordinary skill in the art will appreciate that the herein-described teachings can be applied to prevent any type of dispersion-induced distortion that can significantly afflict baseband waveforms and that can negligibly afflict radiofrequency waveforms (e.g., dielectric loss is an example of another such type of dispersion-induced distortion).

Figure 16:
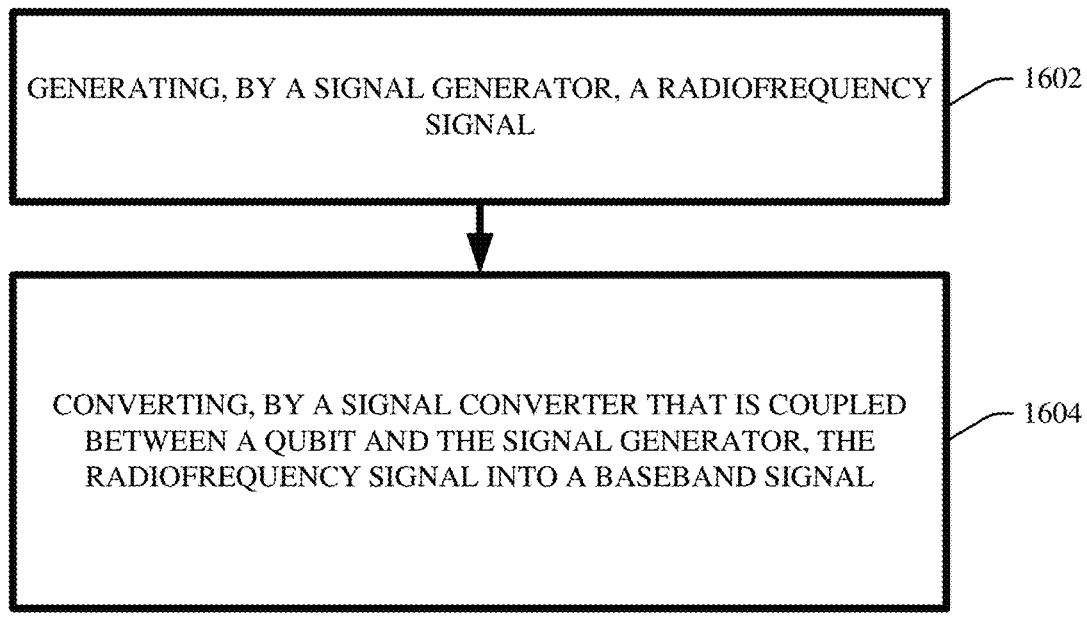
FIGS. 16-17 illustrate example, non-limiting flow diagrams of methodologies that facilitate mitigation of baseband pulse distortion via radiofrequency-to-baseband conversion in accordance with one or more embodiments described herein.
Figure 17:
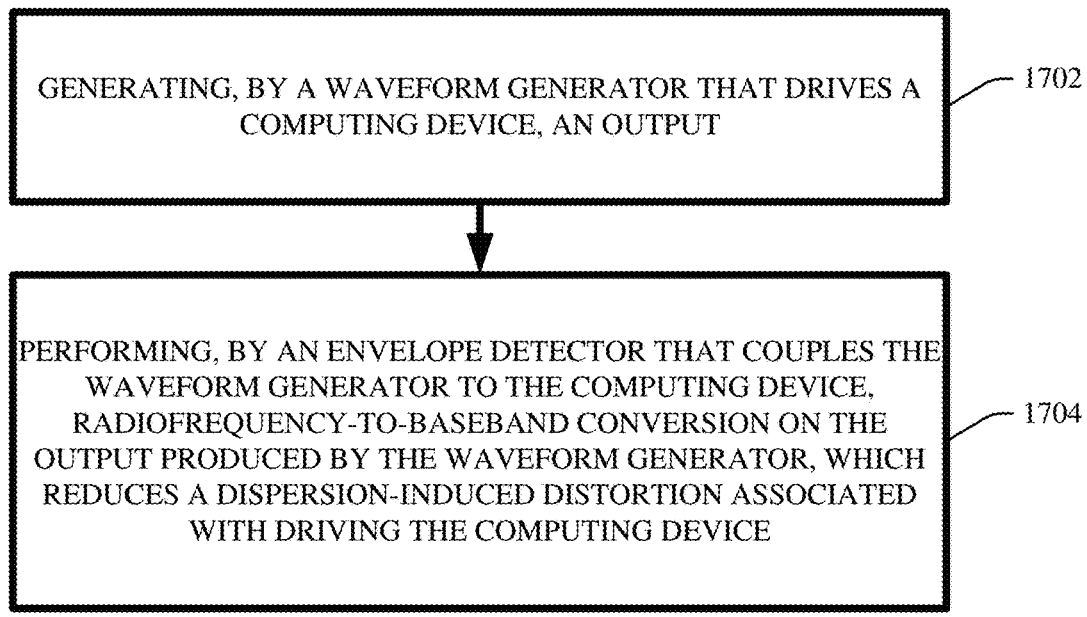

FIGS. 16-17 illustrate example, non-limiting flow diagrams of methodologies 1600 and 1700 that can facilitate mitigation of baseband pulse distortion via radiofrequency-to-baseband conversion in accordance with one or more embodiments described herein.

First, consider the methodology 1600. In various embodiments, act 1602 can include generating, by a signal generator (e.g., 104), a radiofrequency signal (e.g., 112).

In various aspects, act 1604 can include converting, by a signal converter (e.g., 106) that is coupled between a qubit (e.g., 102 and/or a qubit of 102) and the signal generator, the radiofrequency signal into a baseband signal (e.g., 114).

Although not explicitly shown in FIG. 16, a non-superconducting cable (e.g., 108) can be located in a first signal path between the signal generator and the signal converter, and a superconducting cable (e.g., 110) can be located in a second signal path between the signal converter and the qubit.

Although not explicitly shown in FIG. 16, the methodology 1600 can further include: combining, by a bias-tee (e.g., 1304) that is coupled between the signal converter and the qubit, the baseband signal with a constant baseband signal (e.g., 1312).

Although not explicitly shown in FIG. 16, the radiofrequency signal can be a rectangular radiofrequency pulse (e.g., 202), and the baseband signal can be a baseband pulse (e.g., 204) defined by an envelope of the rectangular radiofrequency pulse.

Although not explicitly shown in FIG. 16, the radiofrequency signal can be a rectangular radiofrequency offset pulse (e.g., 1102) that is a result of superimposition of a constant radiofrequency signal (e.g., 1202) onto a rectangular radiofrequency pulse (e.g., 1204) that is 180 degrees out of phase with the constant radiofrequency signal, and the baseband signal can be a baseband offset pulse (e.g., 1104) defined by an envelope of the rectangular radiofrequency offset pulse.

Although not explicitly shown in FIG. 16, the methodology 1600 can further include: generating, by a second signal generator (e.g., the signal generator n in FIG. 15), a second radiofrequency signal (e.g., 1520(*n*)); combining, by a multiplexer (e.g., 1504), the radiofrequency signal with the second radiofrequency signal, thereby yielding a multiplexed radiofrequency signal (e.g., 1522); separating, by a demultiplexer (e.g., 1506), the multiplexed radiofrequency signal into the radiofrequency signal and the second radiofrequency signal; and converting, by a second signal converter (e.g., the envelope detector n in FIG. 15) coupled between the second signal generator and a second qubit (e.g., the qubit device n and/or a qubit of the qubit device n in the FIG. 15), the second radiofrequency signal into a second baseband signal (e.g., 1524(*n*)).

Now, consider FIG. 17. In various embodiments, act 1702 can include generating, by a waveform generator (e.g., 104) that drives a computing device (e.g., 102), an output (e.g., 112).

In various aspects, act 1704 can include performing, by an envelope detector (e.g., 106) that couples the waveform generator to the computing device, radiofrequency-to-baseband conversion on the output produced by the waveform generator, which can reduce a dispersion-induced distortion (e.g., skin effect) associated with driving the computing device.

Although the herein disclosure mainly describes various embodiments of the invention as implementing envelope detectors (e.g., 106), this is a mere non-limiting example. Those having ordinary skill in the art will appreciate that various embodiments described herein can be implemented via any suitable signal converter that can convert a radiofrequency signal into a baseband signal. In other words, various embodiments of the invention are not limited only to envelope detectors (e.g., the envelope detector 106 can be replaced with any suitable signal converter that can perform radiofrequency-to-baseband conversion).

Those having ordinary skill in the art will appreciate that any simulation parameters, simulation results, experimentation parameters, and/or experimentation results described herein are non-limiting examples of various embodiments of the invention.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 18:
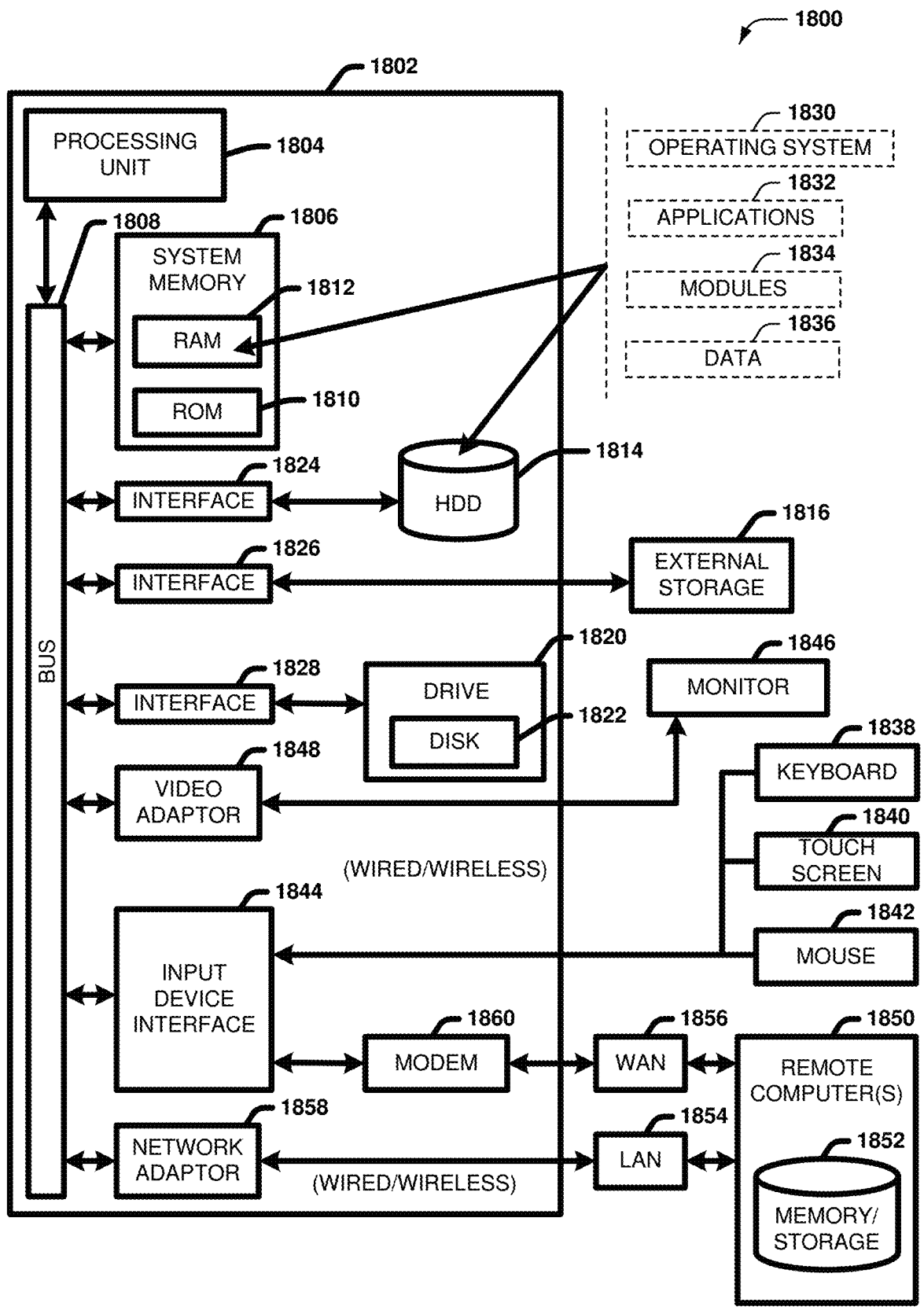
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 19:
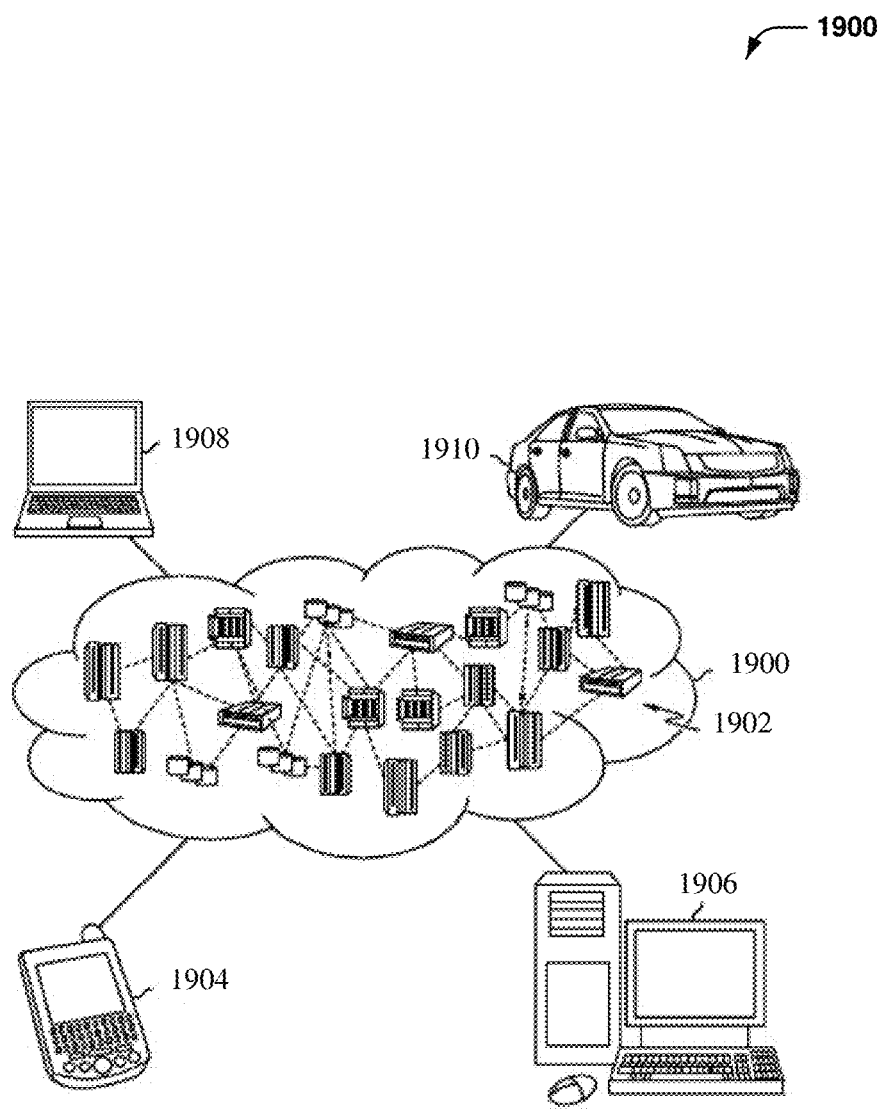
FIG. 19 illustrates an example, non-limiting cloud computing environment in accordance with one or more embodiments described herein.

Referring now to FIG. 19, illustrative cloud computing environment 1900 is depicted. As shown, cloud computing environment 1900 includes one or more cloud computing nodes 1902 with which local computing devices used by cloud consumers, such as, for example, personal digital assistant (PDA) or cellular telephone 1904, desktop computer 1906, laptop computer 1908, and/or automobile computer system 1910 may communicate. Nodes 1902 may communicate with one another. They may be grouped (not shown) physically or virtually, in one or more networks, such as Private, Community, Public, or Hybrid clouds as described hereinabove, or a combination thereof. This allows cloud computing environment 1900 to offer infrastructure, platforms and/or software as services for which a cloud consumer does not need to maintain resources on a local computing device. It is understood that the types of computing devices 1904-1910 shown in FIG. 19 are intended to be illustrative only and that computing nodes 1902 and cloud computing environment 1900 can communicate with any type of computerized device over any type of network and/or network addressable connection (e.g., using a web browser).

Figure 20:
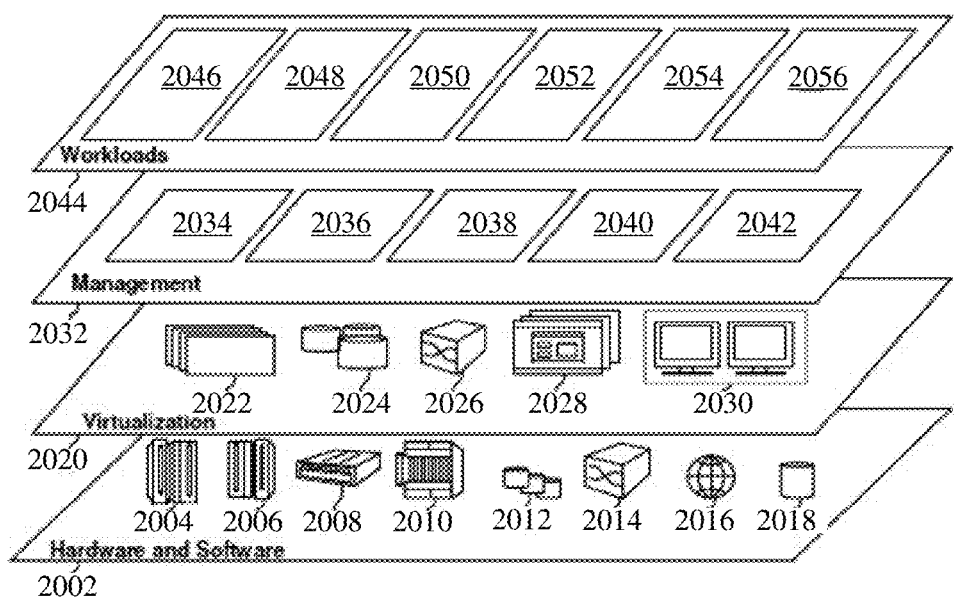
FIG. 20 illustrates example, non-limiting abstraction model layers in accordance with one or more embodiments described herein.

Referring now to FIG. 20, a set of functional abstraction layers provided by cloud computing environment 1900 (FIG. 19) is shown. Repetitive description of like elements employed in other embodiments described herein is omitted for sake of brevity. It should be understood in advance that the components, layers, and functions shown in FIG. 20 are intended to be illustrative only and embodiments of the invention are not limited thereto. As depicted, the following layers and corresponding functions are provided.

Hardware and software layer 2002 includes hardware and software components. Examples of hardware components include: mainframes 2004; RISC (Reduced Instruction Set Computer) architecture based servers 2006; servers 2008; blade servers 2010; storage devices 2012; and networks and networking components 2014. In some embodiments, software components include network application server software 2016 and database software 2018.

Virtualization layer 2020 provides an abstraction layer from which the following examples of virtual entities may be provided: virtual servers 2022; virtual storage 2024; virtual networks 2026, including virtual private networks; virtual applications and operating systems 2028; and virtual clients 2030.

In one example, management layer 2032 may provide the functions described below. Resource provisioning 2034 provides dynamic procurement of computing resources and other resources that are utilized to perform tasks within the cloud computing environment. Metering and Pricing 2036 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2038 provides access to the cloud computing environment for consumers and system administrators. Service level management 2040 provides cloud computing resource allocation and management such that required service levels are met. Service Level Agreement (SLA) planning and fulfillment 2042 provide pre-arrangement for, and procurement of, cloud computing resources for which a future requirement is anticipated in accordance with an SLA.

Workloads layer 2044 provides examples of functionality for which the cloud computing environment may be utilized. Examples of workloads and functions which may be provided from this layer include: mapping and navigation 2046; software development and lifecycle management 2048; virtual classroom education delivery 2050; data analytics processing 2052; transaction processing 2054; and differentially private federated learning processing 2056. Various embodiments of the present invention can utilize the cloud computing environment described with reference to FIGS. 19 and 20 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a qubit;
   a signal generator producing a radiofrequency signal; and
   a signal converter coupled between the qubit and the signal generator, wherein the signal converter converts the radiofrequency signal into a baseband signal, wherein the radiofrequency signal is a rectangular radiofrequency offset pulse that is a result of superimposition of a constant radiofrequency signal onto a rectangular radiofrequency pulse that is 180 degrees out of phase with the constant radiofrequency signal.

2. The system of claim 1, further comprising:
a non-superconducting cable located in a first signal path between the signal generator and the signal converter; and
a superconducting cable located in a second signal path between the signal converter and the qubit.

3. The system of claim 1, wherein the signal converter is an envelope detector.

4. The system of claim 1, further comprising:
a bias-tee coupled between the signal converter and the qubit, wherein the bias-tee combines the baseband signal with a constant baseband signal.

5. The system of claim 1, wherein the radiofrequency signal is a rectangular radiofrequency pulse, and wherein the baseband signal is a baseband pulse defined by an envelope of the rectangular radiofrequency pulse.

6. The system of claim 1, wherein the baseband signal is a baseband offset pulse defined by an envelope of the rectangular radiofrequency offset pulse.

7. The system of claim 1, further comprising:
a second qubit, a second signal generator producing a second radiofrequency signal, and a second signal converter coupled between the second qubit and the second signal generator;
a multiplexer located at an end of a non-superconducting cable, wherein the multiplexer combines the radiofrequency signal with the second radiofrequency signal, thereby yielding a multiplexed radiofrequency signal; and
a demultiplexer coupled to another end of the non-superconducting cable and that separates the multiplexed radiofrequency signal into the radiofrequency signal and the second radiofrequency signal, wherein the second signal converter converts the second radiofrequency signal to a second baseband signal.

8. The system of claim 1, wherein the signal converter is implemented at a cryogenic temperature.

9. A method, comprising:
generating, by a signal generator, a radiofrequency signal; and
converting, by a signal converter that is coupled between a qubit and the signal generator, the radiofrequency signal into a baseband signal, wherein the radiofrequency signal is a rectangular radiofrequency offset pulse that is a result of superimposition of a constant radiofrequency signal onto a rectangular radiofrequency pulse that is 180 degrees out of phase with the constant radiofrequency signal.

10. The method of claim 9, wherein a non-superconducting cable is located in a first signal path between the signal generator and the signal converter, and wherein a superconducting cable is located in a second signal path between the signal converter and the qubit.

11. The method of claim 9, wherein the signal converter is an envelope detector.

12. The method of claim 9, further comprising:
combining, by a bias-tee that is coupled between the signal converter and the qubit, the baseband signal with a constant baseband signal.

13. The method of claim 9, wherein the radiofrequency signal is a rectangular radiofrequency pulse, and wherein the baseband signal is a baseband pulse defined by an envelope of the rectangular radiofrequency pulse.

14. The method of claim 9, wherein the baseband signal is a baseband offset pulse defined by an envelope of the rectangular radiofrequency offset pulse.

15. The method of claim 9, further comprising:
generating, by a second signal generator, a second radiofrequency signal;
combining, by a multiplexer, the radiofrequency signal with the second radiofrequency signal, thereby yielding a multiplexed radiofrequency signal;
separating, by a demultiplexer, the multiplexed radiofrequency signal into the radiofrequency signal and the second radiofrequency signal; and
converting, by a second signal converter coupled between the second signal generator and a second qubit, the second radiofrequency signal into a second baseband signal.

16. The method of claim 9, wherein the signal converter is implemented at a cryogenic temperature.

17. An apparatus, comprising:
a qubit;
a signal generator operable to produce a radiofrequency signal;
a signal converter coupled between the qubit and the signal generator, wherein the signal converter is operable to convert the radiofrequency signal into a baseband signal;
a multiplexer operable to combine the radiofrequency signal with a second radiofrequency signal, thereby yielding a multiplexed radiofrequency signal; and
a demultiplexer operable to separate the multiplexed radiofrequency signal into the radiofrequency signal and the second radiofrequency signal, wherein the second signal converter is operable to convert the second radiofrequency signal to a second baseband signal.

18. The apparatus of claim 17, wherein the signal generator is implemented at a non-cryogenic temperature, and wherein the qubit and the signal converter are implemented at cryogenic temperatures.

19. The apparatus of claim 17, further comprising:
a bias-tee coupled between the signal converter and the qubit, wherein the bias-tee is operable to combine the baseband signal with a constant baseband signal, and wherein the bias-tee is implemented at a cryogenic temperature.

20. The apparatus of claim 17, further comprising:
a second qubit, a second signal generator operable to produce a second radiofrequency signal, and a second signal converter coupled between the second qubit and the second signal generator,
wherein the multiplexer is implemented at a non-cryogenic temperature, and wherein the demultiplexer is implemented at a cryogenic temperature.

* * * * *